(12) United States Patent
Takasaka et al.

(10) Patent No.: US 6,244,960 B1
(45) Date of Patent: *Jun. 12, 2001

(54) TABLET UNIT AND VIRTUAL EXPERIENCE METHOD

(75) Inventors: Akira Takasaka; Iwakichi Ogawa, both of Tokyo (JP)

(73) Assignee: Sega Enterprises, Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/035,026

(22) Filed: Mar. 5, 1998

(30) Foreign Application Priority Data

Mar. 6, 1997 (JP) ................................................ 9-051404

(51) Int. Cl.[7] .............................. A63B 9/24; A63H 33/30; A63H 13/04
(52) U.S. Cl. ............................. 463/37; 446/141; 446/318
(58) Field of Search .................................. 463/1, 36–39, 463/46–47; 273/148 B, 237–238; 434/128, 338–339, 317, 362, 307 R, 428; 446/141–143, 147, 318, 408; 345/145, 156–158, 173–179, 169, 901

(56) References Cited

U.S. PATENT DOCUMENTS

| | | | |
|---|---|---|---|
| Re. 33,662 | * | 8/1991 | Blair et al. . |
| 4,353,552 | * | 10/1982 | Pepper, Jr. . |
| 4,526,078 | * | 7/1985 | Chadabe . |
| 5,209,665 | * | 5/1993 | Billings et al. .................. 446/143 |
| 5,681,220 | * | 10/1997 | Bertram et al. ..................... 463/37 |
| 5,777,605 | * | 7/1998 | Yoshinobu .......................... 463/37 |
| 5,967,898 | * | 10/1999 | Takasaka et al. ................... 463/37 |

FOREIGN PATENT DOCUMENTS 5-137846   6/1993   (JP) .

* cited by examiner

Primary Examiner—Mark Sager
(74) Attorney, Agent, or Firm—Dickstein Shapiro Morin & Oshinsky LLP

(57) ABSTRACT

The tablet unit 10 comprises a receiving antenna which is brought near a prescribed position on the tablet when the tablet unit is connected to the electronic device 12 and receives the scan signal supplied to the antenna line; operating means 38 which has coordinate values on the tablet assigned to and inputs instruction information by operation of an operator; instruction signal generating means for generating an instruction signal delayed with respect to the scan signal received by the receiving antenna by a prescribed time which is based on the coordinate values assigned to the operating means 38 when the operating means 38 is operated by the operator; and transmitting means 74 which is brought near a touch pen 50 when the tablet unit is connected to the electronic device 12 and transmits the instruction signal generated by the instruction signal generating means to the touch pen 50. The tablet unit including the operational means 38, which inputs instruction information by approaching the touch pen 50 to the tablet 10 is connected to an electronic device 12, whereby the operational means is operated to input instruction information.

7 Claims, 22 Drawing Sheets

US 6,244,960 B1

TABLET UNIT AND VIRTUAL EXPERIENCE METHOD

BACKGROUND OF THE INVENTION

The present invention relates to a tablet unit for inputting instruction information by approaching a touch pen to a tablet, which (tablet unit) can be removably connected to an electronic device, and a virtual experience method by the use of an electronic device with the tablet unit connected to.

As an image device typically exemplified by video game devices for children is known an image device in which picture book-type software is loaded into the device, children play the game, watching both the picture book and the TV monitor screen so that they can enjoy experiencing a simulation.

FIG. 22 shows an example of such video game device.

The video game device 12 includes a foldable game device body 14. An upper lid 18 is taken off from a bottom lid 16 of the game device body 14 to open and load a game cartridge 22 of picture book-type in a cartridge slot 20 formed in the inside of the upper lid 18. Four direction buttons 24 and one operation button 26 are disposed on the left side of the bottom lid 16 of the game device body 14, a tablet 28 is disposed at the center of the bottom lid 16, and a touch pen holder 30 is disposed at the right of the bottom lid 16. The four direction buttons 24 are an upward direction button 24a, a downward direction button 24b, a leftward button 24c and a rightward button 24d which are arranged in a cross.

The direction buttons 24 and the operation button 26 are operated by a game player, and the game player commands four directions, upward, downward, leftward and rightward directions, by the direction buttons 24 and give execution instructions by the operation button 26. A touch pen holder 30 holds a touch pen 32. The touch pen 32 is used to touch a picture book of the game cartridge 22 and the tablet 28 to operate the picture book software. A video game device 12 detects by electromagnetic induction system a position on the tablet 28 to which the touch pen 32 is approached. The electromagnetic induction system is one, as described in Japanese Patent Laid-Open Publication No. 137846/1993, that electromagnetic signals generated by the table 28 are received by the touch pen 32 to detect positions.

At the center of the inside of the upper lid 18 of the game device body 14, there is disposed a picture book mount 34 for the picture book-type game cartridge 22 to be mounted on. The picture book mount 34 detects by the same electromagnetic system as the tablet 28 a position on the picture book-type game cartridge 22 where the touch pen 32 is approached.

In the video game device 12 thus using picture book software, a required position of the picture book is touched by the touch pen 32 to change a game display presented on a TV monitor screen, or a specific position on a game display is commanded by the touch pen 32, whereby various games can be played. The tablet 28 is traced by the touch pen 32 as a picture is drawn with a pencil on a sheet of paper, whereby a picture can be freely drawn on a TV monitor screen.

However in the above-described video game device 12 inputting means a game player can operate for operational inputs are only the direction buttons 24, the operation button 26 and the touch pen 32. Accordingly simulation games played by personal computers in which operational inputs are made by means of a keyboard cannot be played.

SUMMARY OF THE INVENTION

An object of the present invention is to provide tablet unit for inputting instruction information by approaching a touch pen to a tablet, which (tablet unit) can be removably connected to a game device and which permits operational inputs to be made by means of a number of keys, etc.

Another object of the present invention is to provide a virtual experience method by the use of a game device with the tablet unit connected to.

The above-described object can be achieved by a tablet unit for inputting required instruction information by approaching a touch pen to a tablet including antenna lines for a scan signal to be supplied to and being removably connectable to an electronic device, the tablet unit comprising: a receiving antenna which is brought near a prescribed position on the tablet when the tablet unit is connected to the electronic device and receives the scan signal supplied to the antenna line; operating means which has coordinate values on the tablet assigned to and inputs instruction information by operation of an operator; instruction signal generating means for generating an instruction signal delayed with respect to the scan signal received by the receiving antenna by a prescribed time which is based on the coordinate values assigned to the operating means when the operating means is operated by the operator; and transmitting means which is brought near the touch pen when the tablet unit is connected to the electronic device and transmits the instruction signal generated by the instruction signal generating means to the touch pen. The tablet unit including the operational means, which inputs instruction information by approaching the touch pen to the tablet is connected to an electronic device, whereby the operational means is operated to input instruction information.

In the above-described tablet unit it is preferable that the receiving antenna has a non-symmetric receiving surface, and the scan signal received by the receiving surface of the receiving antenna differs depending on a scan direction of the tablet.

In the above-described tablet unit it is preferable that the receiving antenna includes a plurality of receiving parts, and the scan signal received by said a plurality of receiving parts of the receiving antenna differs depending on scan directions of the tablet.

In the above-described tablet unit it is preferable that the tablet unit imitates a keyboard, and the operating means is a plurality of keys of the keyboard.

In the above-described tablet unit it is preferable that the tablet unit imitates a telephone and further comprises a handset for inputting/outputting voices, and the operating means is a plurality of buttons of the telephone.

The above-described object can be achieved by a virtual experience method using the electronic device with the tablet unit described above connected to, personal computer communication, game or educational virtual experiences are enjoyed by operating said a plurality of keys. The video game device with the tablet unit connected to can provide the virtual experience method.

The above-described object can be achieved by a virtual experience method using the electronic device with the tablet unit described above connected to, telephone communication, game or educational virtual experiences are enjoyed by inputting/outputting voices in/from the handset by operating said a plurality of buttons of the telephone. The video game device with the tablet unit connected to can provide the virtual experience method.

BRIEF DESCRIPTION OF THE DRAWINGS

FIG. 22 is an appearance view of a video game device the present invention is applicable to.

DETAILED DESCRIPTION OF THE INVENTION

[A First Embodiment]

(Keyboard-type Tablet Unit)

Figure 1:
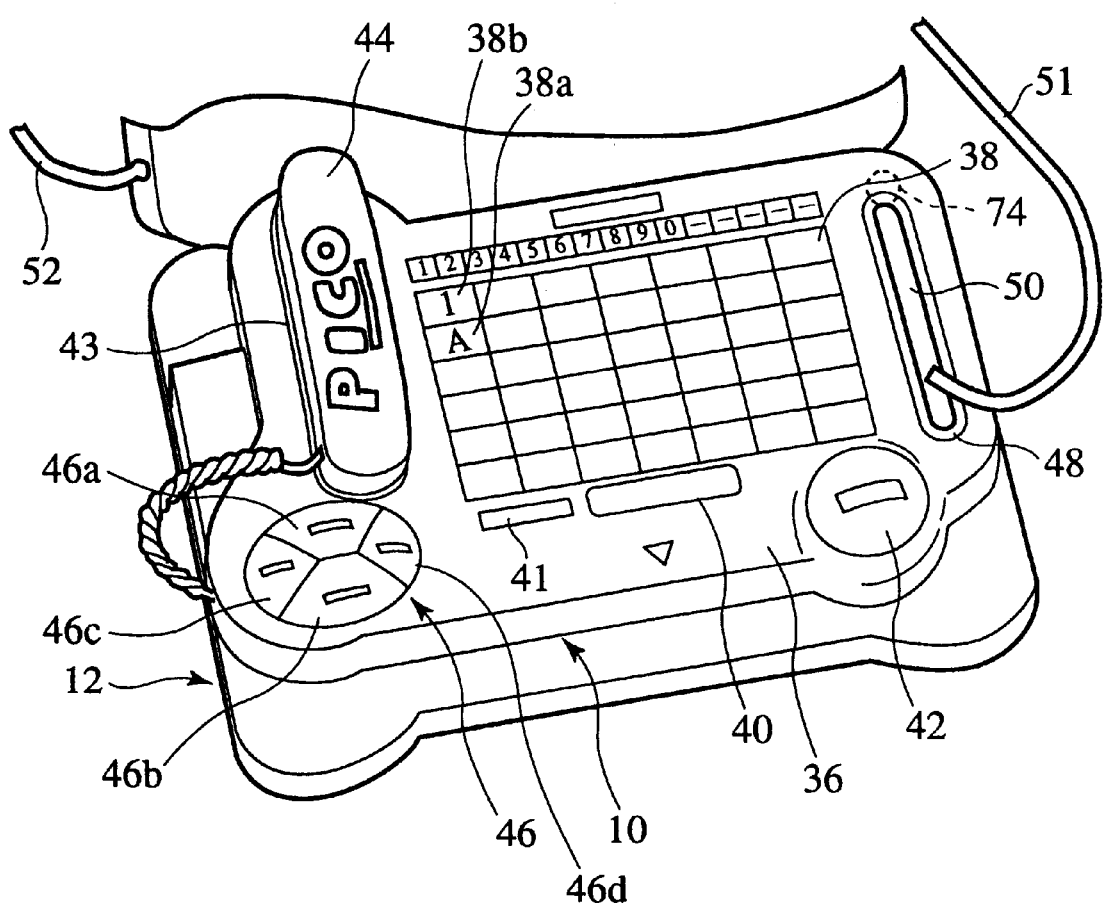
FIG. 1 is a perspective view of the tablet unit according to a first embodiment of the present invention.
Figure 2:
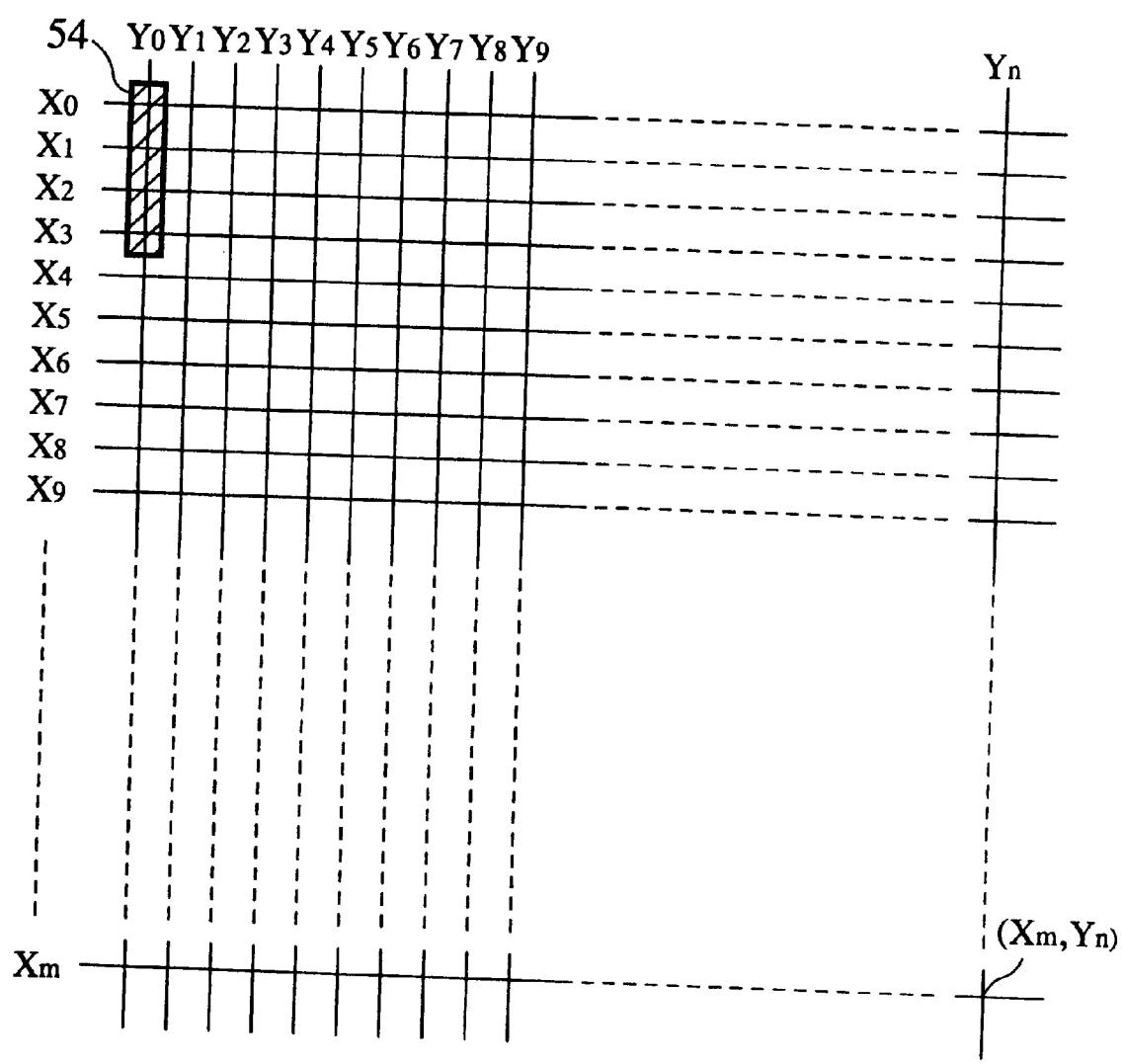
FIG. 2 is a plan view of the tablet unit according to the first embodiment of the present invention, which shows a position of the receiving antenna.
Figure 3:
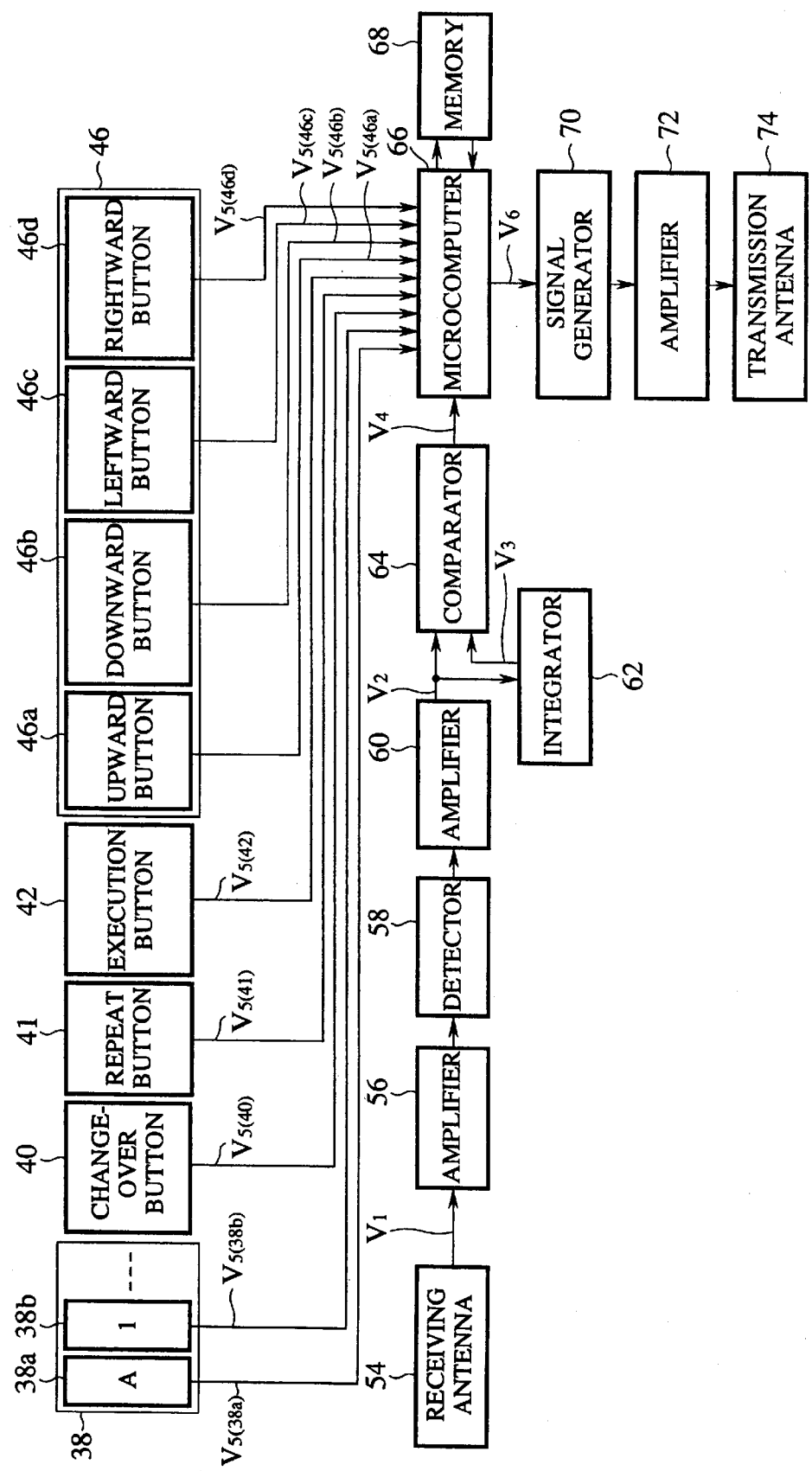
FIG. 3 is a block diagram of an electronic circuit of the tablet unit according to the first embodiment of the present invention.
Figure 4:
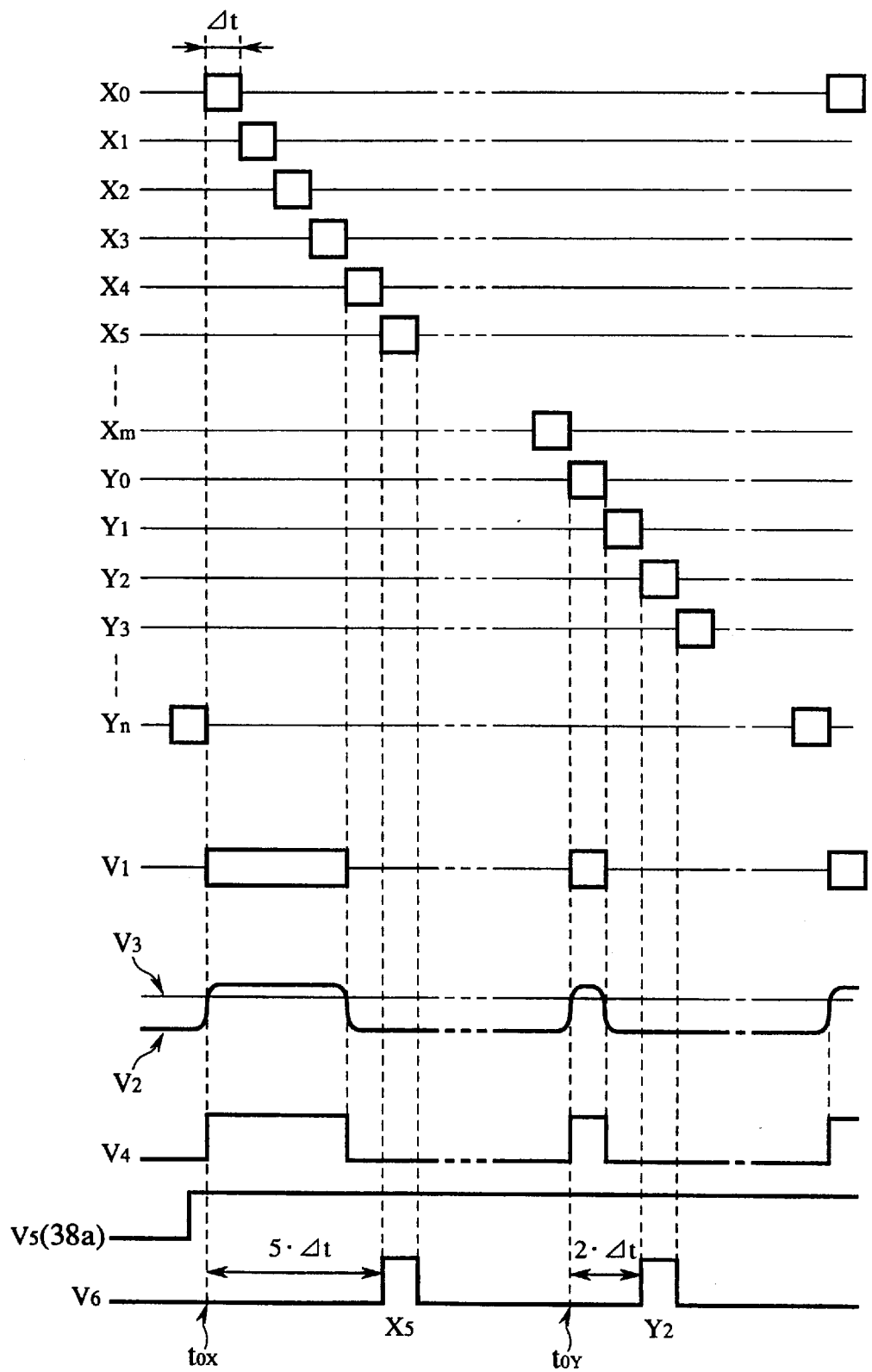
FIG. 4 is a time chart of waveforms of respective part of the tablet unit according to the first embodiment of the present invention.

The tablet unit according to a first embodiment of the present invention will be explained with reference to FIGS. 1 to 4. FIG. 1 is a perspective view of the tablet unit according to the present embodiment. FIG. 2 is a plan view of the tablet unit according to the present embodiment, which shows a position of the receiving antenna. FIG. 3 is a block diagram of an electronic circuit of the tablet unit according to the present embodiment. FIG. 4 is a time chart of waveforms of respective part of the tablet unit according to the present embodiment.

First, a structure of the tablet unit according to the present embodiment will be explained.

As shown in FIG. 1, the tablet unit 10 according to the present embodiment is characterized by imitating a keyboard. The tablet unit 10 includes a body 36 imitating a keyboard of a personal computer and is to be mounted on a video game device 12.

A number of keys 38 are arranged in a matrix at the center of the tablet unit 10. The keys 38 include a number of keys, e.g., an A key 38a representing an alphabet "A", a 1 key 38b representing a number "1", etc.

A change-over button 40 is disposed on the foreground below the keys 38, and an execution button 42 is disposed on the right side of the change-over button 40.

A handset holder 43 is disposed on the left side on the keys 38. The handset holder 43 holds a handset 44. Four direction buttons 46 are disposed on the foreground below the handset holder 43. The four direction buttons 46 include an upward button 46, a downward button 46b, a leftward button 46c and a rightward button 46d which are arranged in a cross.

The direction buttons 46 and the execution button 42 are operated by a game player. Four upward, downward, leftward and rightward directions are commanded by the direction buttons 46, and execution instructions are given by the execution button 42.

A touch pen holder 48 is disposed on the right side of the keys 38. The touch pen holder 48 holds a touch pen 50.

A signal cable 51 connects the touch pen 50 to a signal input terminal (not shown) of the video game device 12.

A signal cable 52 connects audio/video output terminals (not shown) of the video game device 12 to a audio/video input terminals (not shown) of a TV monitor (not shown).

Two dry cells (not shown) are mounted as an electric power source in the table unit 10.

Figure 22:
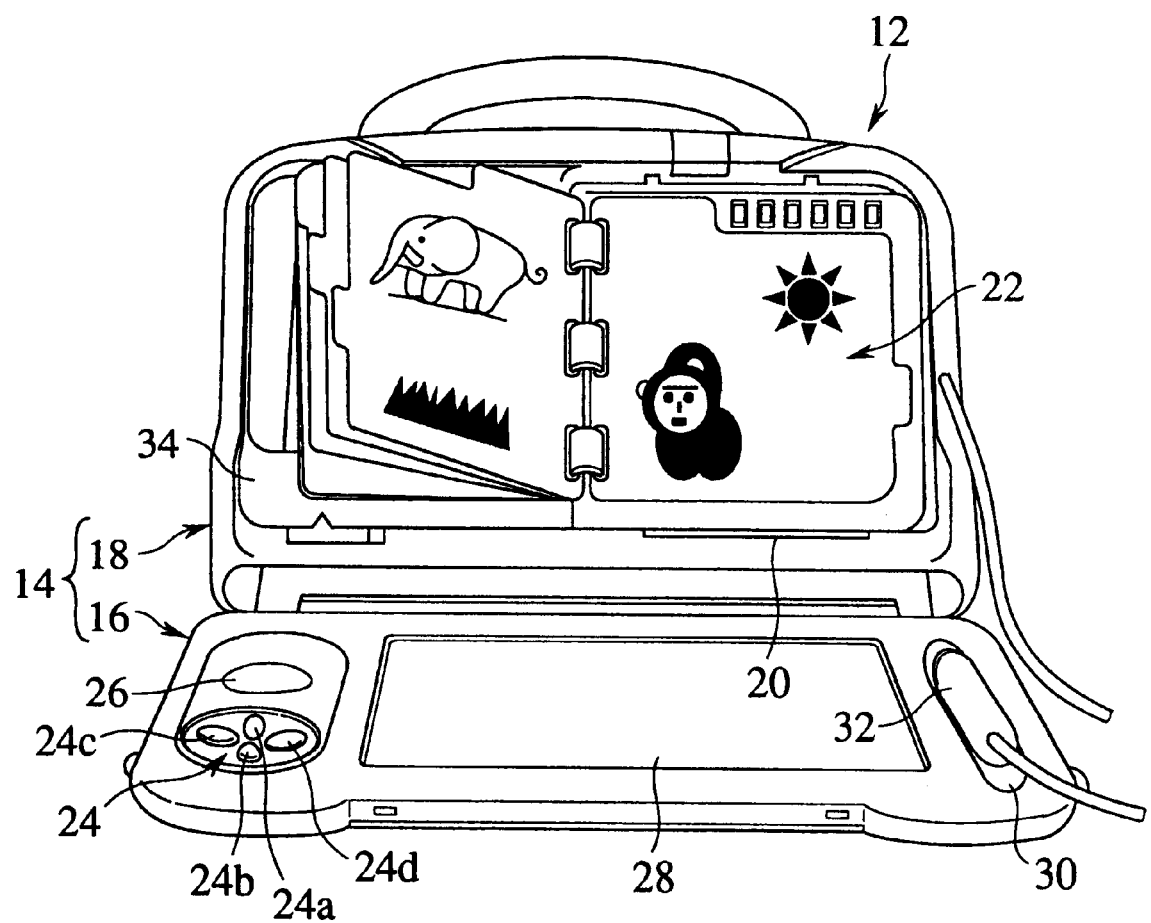

As shown in FIG. 2, a tablet 28 (see FIG. 22) of the video game device 12 includes antenna lines $X_0$ to $X_m$ (m is a positive integer) and antenna lines $Y_0$ to $Y_n$ (n is a positive integer) arranged in a matrix. The tablet unit 10 includes a receiving antenna 54 in a rectangular shape having longer sides in the X-direction than in the Y-direction. When the tablet unit 10 is connected to the vide game device 12, the receiving antenna 54 is positioned at, e.g., coordinates ($X_0$, $Y_0$) to ($X_3$, $Y_0$).

In FIG. 2, for convenience constituent members other than the antenna lines $X_0$ to $X_m$ and the antenna lines $Y_0$ to $Y_n$, and the receiving antenna 54 are omitted. In the following description an intersection between the antenna line $X_m$ and the antenna line $Y_n$ has coordinates ($X_m$, $Y_n$).

As shown in FIG. 4, scan signals are supplied sequentially to the antenna lines $X_0$ to $X_m$ of the tablet 28 for a time $\Delta t$, and scan signals are supplied sequentially to the antenna lines $Y_0$ to $Y_n$ for a time $\Delta t$. A scan signal is a burst wave of, e.g., 455 kHz and 16 waves. One scan completes for, e.g., 5 ms and is repeated.

The tablet unit 10 incorporates an electronic circuit as shown in FIG. 3.

The receiving antenna 54 receives the scan signals supplied to the antenna lines $X_0$ to $X_3$ and the scan signal supplied to the antenna line $Y_0$ to output a signal $V_1$ as shown in FIG. 4. The signal $V_1$ is supplied to an amplifier 56 to be amplified there and inputted to a detector 58.

The detector 58 detects a 455 kHz alternate signal used as a scan signal and outputs a high output voltage during detection. An output signal of the detector 58 is inputted to an amplifier 60 and amplified there to be outputted as a signal $V_2$.

A signal $V_2$ outputted by the amplifier 60 is supplied to an integrator 62 and a comparator 64. The integrator 62 integrates the signal $V_2$ to output an integrated waveform as a signal $V_3$. The integrator 62 holds a voltage of the signal $V_3$ until the detector 58 performs a next detection.

The comparator 64 compares a voltage of the signal $V_2$ and that of the signal $V_3$ with each other to output a comparison result as a signal $V_4$. When a voltage of the signal $V_2$ is higher than that of the signal $V_3$, the signal $V_4$ is H (high) level, and the signal $V_4$ is L (low) level when a voltage of the signal $V_2$ is lower than that of the signal $V_3$. That is, an output $V_4$ of the comparator 64 is H level while the receiving antenna 54 is receiving a 455 kHz scan signal, and while the receiving antenna 54 is not receiving a 455 kHz scan signal, an output $V_4$ is L level. A signal $V_4$ outputted by the comparator 64 is supplied to a microcomputer 66.

Time of the signal $V_4$ becoming H level when scan signals are supplied to the antenna lines $X_0$ to $X_3$ is different from that of the signal $V_4$ becoming H level when a scan signal is supplied to the antenna line $Y_0$. Accordingly, the microcomputer 66 separately detects supply of scan signals to the antenna lines $X_0$ to $X_3$ and that of a scan signal to the antenna line $Y_0$, based on waveforms of the signal $V_4$.

The microcomputer 66 set a time when the signal $V_4$ becomes H level after an operation signal starts to be supplied to the antenna line $X_0$ to be a standard time $t_{0x}$ for scan in the X-direction. The microcomputer 66 sets a time when the signal $V_4$ becomes H level after an operation signal is supplied to the antenna line $Y_0$ to be a standard time $t_{0y}$ for scan in the Y-direction.

States of the A key 38$a$, 1 key 38$b$ . . . , the change-over button 40, the repeat button 41, the execution button 42, the upward button 46$a$, the downward button 46$b$, the leftward button 46$c$, the rightward button 46$d$ are outputted respectively as signals $V_{5(38a)}$, $V_{5(38b)}$, . . . , $V_{5(40)}$, $V_{5(41)}$, $V_{5(42)}$, $V_{5(46a)}$, $V_{5(46b)}$, $V_{5(46c)}$ and $V_{5(46d)}$ to be inputted to the microcomputer 66. These signals $V_{5(38a)}$, $V_{5(38b)}$, . . . , $V_{5(40)}$, $V_{5(41)}$, $V_{5(42)}$, $V_{5(46a)}$, $V_{5(46b)}$, $V_{5(46c)}$, and $V_{5(46d)}$ are normally L level and become H level when pushed.

Specific coordinate values ($X_i$, $Y_j$) (i and j are positive integers) are assigned beforehand respectively to the keys 38, the change-over button 40, the repeat button 41, the execution button 42 and the direction buttons 46. These coordinate values ($X_i$, $Y_j$) are stored in a memory 68. The memory 68 is connected to the microcomputer 66, and the coordinate values ($X_i$, $Y_j$) are read by the microcomputer 66 when required.

When the signal $V_5$ becomes H level, the microcomputer 66 reads from the memory 68 the coordinate values ($X_i$, $Y_j$) assigned to that of the keys 38, the change-over button 40, the repeat button 41, the execution button 42 and the direction buttons 46, which has outputted the signal $V_5$. The signal $V_6$ is delayed in the standard time $t_{0x}$ of the scan in the X-direction by a i·$\Delta t$ time to make the signal $V_6$ H level only for a $\Delta t$ time. The signal $V_6$ is delayed in the standard time $t_{0y}$ of the scan in the Y-direction by a j·$\Delta t$ time to make the signal $V_6$ H level only for the $\Delta t$ time. This operation is repeated while one of the keys 38, the change-over button 40, the repeat button 41, the execution button 42 and the direction buttons 46 is being pushed.

The signal $V_6$ outputted by the microcomputer 66 is supplied to a signal generator 70. The signal generator 70 outputs a 455 kHz alternate signal while the signal $V_6$ is H level. The 455 kHz alternate signal outputted by the signal generator 70 is amplified by an amplifier 72 to be outputted from a transmission antenna 74.

The transmission antenna 74 is disposed near the touch pen holder 48. A signal outputted by the transmission antenna 74 is received by the touch pen 50.

The signal received by the touch pen 50 is inputted to the video game device through the signal cable 51.

A memory (not shown) of the video game device 12 stores in advance the coordinate values ($X_i$, $Y_j$) respectively assigned to the keys 38, the change-over button 40, the repeat button 41, the execution button 42 and the direction buttons 46.

The signal inputted to the video game device 12 is generated based on the coordinate values ($X_i$, $Y_j$) assigned to the keys 38, the change-over button 40, the repeat button 41, the execution button 42 and the direction buttons 46, so that the microcomputer of the video game device 12 can detect which of the keys 38, the change-over button 40, the repeat button 41, the execution button 42 and direction buttons 46 has been pushed.

Then, for example, the operation performed when the A key 38$a$ is pushed will be explained.

Coordinate values ($X_5$, $Y_2$), for example, are assigned to the A key 38$a$.

For example, the A key 38$a$ is pushed while a scan signal is being supplied to the antenna $Y_n$. The signal $V_{5(30a)}$ is H level while the A key is being pushed.

The microcomputer 66 reads the coordinate values ($X_5$, $Y_2$) assigned to the A key 38$a$ when the signal $V_{5(38b)}$ in H level, and delays the signal $V_6$ in the standard time $t_{0x}$ of scan in the X direction by a 5·$\Delta t$ time to make the signal $V_6$ H level for the $\Delta t$ time. This operation is repeated while the A key 38$a$ is being pushed.

The microcomputer 66 can thus make the signal $V_6$ H level in agreement with timing of scan signals being supplied to the antenna line $X_5$ and the antenna line $Y_2$.

While the signal $V_6$ is kept H level, a 455 kHz alternate signal is outputted by the signal generator 70, amplified by the amplifier 72 and outputted from the transmission antenna 74. The 455 kHz alternate signal outputted by the transmission antenna 74 is inputted to the video game device 12 through the touch pen 50 and the signal cable 51.

Thus, the tablet unit 10 generates the same signal as that generated when the touch pen 50 approached to the coordinate values $(X_5, Y_2)$ on the tablet 28 and inputs the signal to the video game device 12.

The memory of the video game device 12 stores the coordinate values $(X_5, Y_2)$ assigned to the A key 38a, so that the microcomputer of the video game device 12 can detect that the A key 38a has been pushed.

In the same way as described above, push of the keys 38, the change-over button 40, the repeat button 41, the execution button 42, the direction buttons 46 can be detected.

As described above, according to the present embodiment, the table unit for inputting instruction information by approaching the touch pen to the tablet, which can be removably connected to a game device and permits operation inputs to be made by a number of keys, etc. can be provided.

(Virtual Experience Method)

Figure 5:
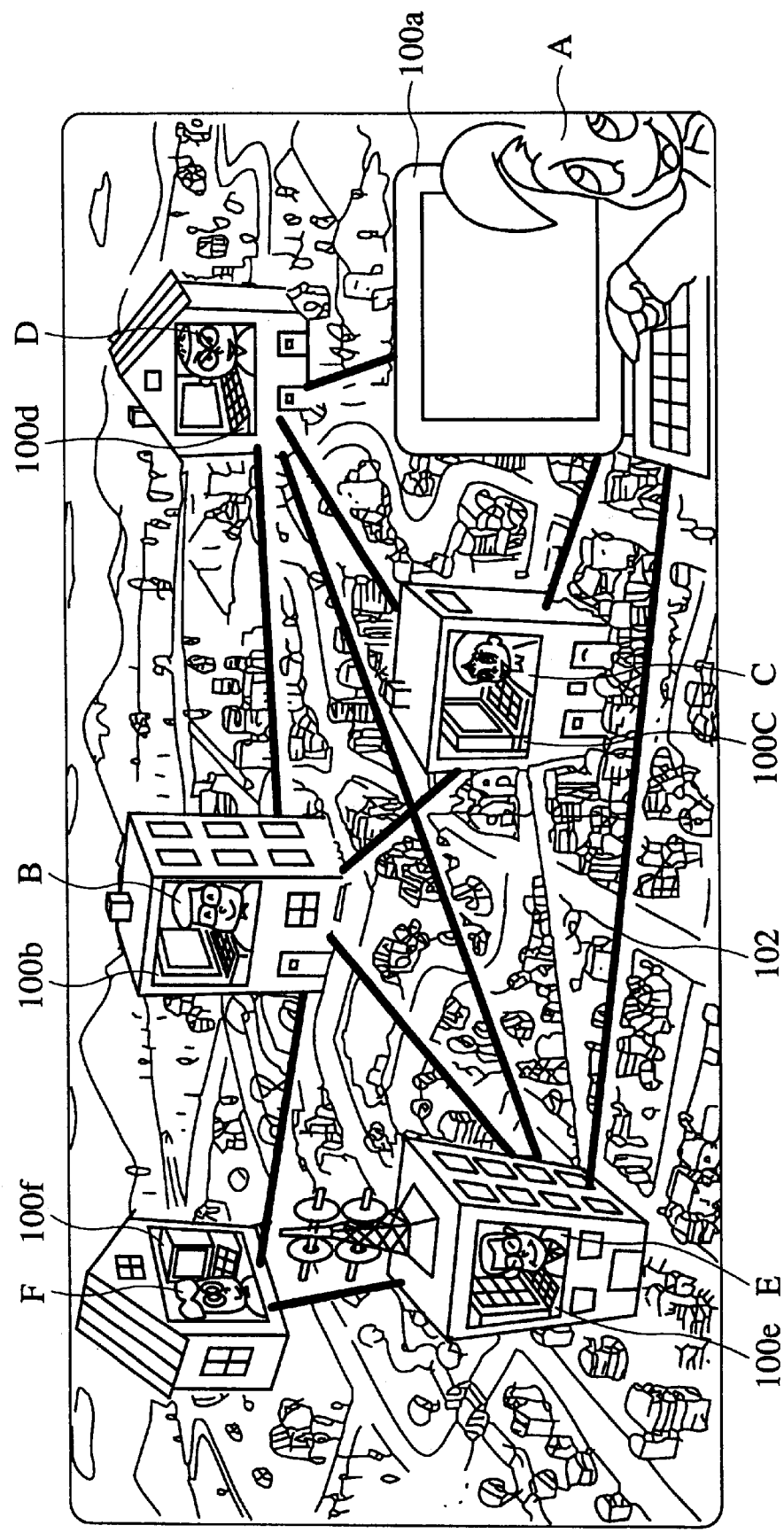
FIG. 5 is a display image on a TV monitor screen, which represents a personal computer communication game using the virtual experience method according to the first embodiment of the present invention.

Then, a virtual experience method by the use of the video game device 12 with the above-described keyboard-type tablet unit 10 connected to will be explained with reference to FIGS. 5 to 12. FIG. 5 is an image of a personal computer communication game played by the virtual experience method according to the present embodiment, which (image) is displayed on the TV monitor screen. FIG. 6 shows images of an electronic mail game played by the virtual experience method according to the present embodiment, which (images) are displayed on the TV monitor screen. FIG. 7 shows images of a competing fighting game played by the virtual experience method according to the present embodiment, which (images) are displayed on the TV monitor screen. FIG. 8 is an image of an internet shopping game played by the virtual experience method according to the present embodiment, which (image) is displayed on the TV monitor screen. FIG. 9 shows images of a shopping game played by the virtual experience method according to the present embodiment, which (images) are displayed on the TV monitor screen. FIG. 10 shows images of a music school game played by the virtual experience method according to the present embodiment, which (images) are displayed on the TV monitor screen. FIG. 11 is an image of an internet communication game played by the virtual experience method according to the present embodiment, which (image) is displayed on the TV monitor screen. FIG. 12 shows images of a quiz game played by the virtual experience method according to the present embodiment, which (images) are displayed on the TV monitor screen.

When a game player turns on the video game device 12, a menu image (not shown) is displayed on the TV monitor screen. On the menu image, menus, such as the personal computer communication game, the internet shopping game, the internet communication game, etc., are displayed. The game player operates the direction buttons 46 to select one of the menus, and gives an execution instruction by operating the execution button 42. When the execution instruction is given, a selected game is started.

(Personal Computer Communication Game)

A personal computer communication game is for virtually experiencing personal communication through images on the TV monitor screen. When the personal computer communication game is started, as an initial display an image which enables a game player to image the personal computer communication is displayed (see FIG. 5). A hero A displayed lower right on the TV monitor screen plays a role of presiding over the game. A personal computer 10a of the hero A is connected to personal computers 100b, 100c, 100d, 100e, 100f of his friends B, C, D, E, F by a communication network 102.

The personal computer communication game has several kinds of menus, such as the electronic mail game, the competing fighting game, etc. for enjoying virtual experiences.

Figure 6A:
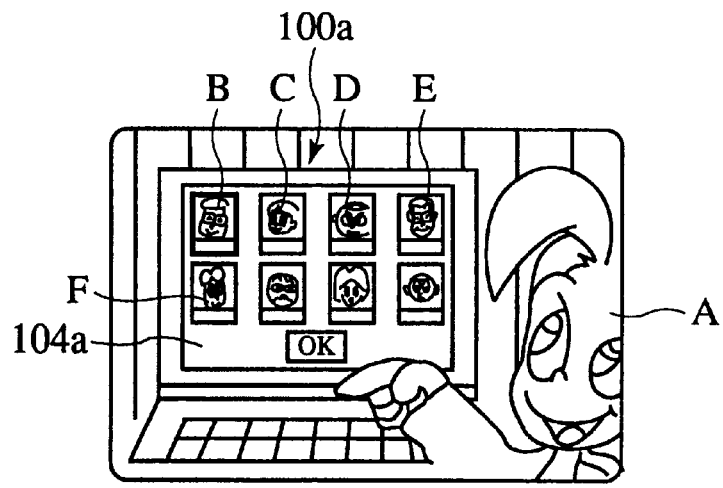
FIG. 6 is display images on the TV monitor screen, which represent an electronic mail game using the virtual experience method according to the first embodiment of the present invention.

When the electronic mail game is started, as shown in FIG. 6A, the personal computer 100a is displayed, and the friends B, C, D, E, F are displayed on a display 104a of the personal computer 100a. When an electronic mail has arrived from the friend B, the image of the friend B is displayed distinguishably over the other friends.

Figure 6B:
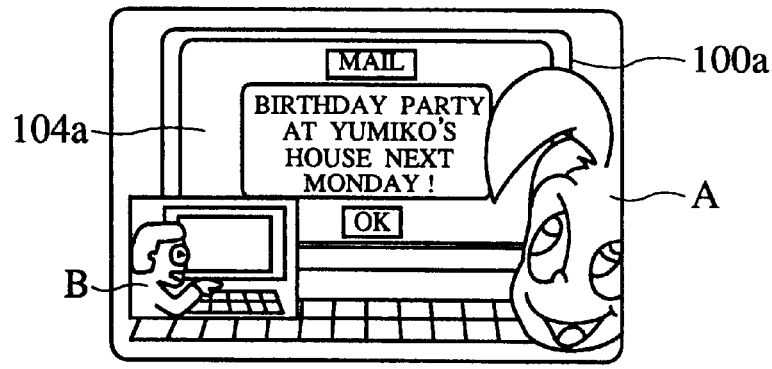

The direction buttons 46 are operated to select the friend B, and an execution command is given by operating the execution button 42, as shown in FIG. 6B, an electronic mail "Birthday party at Yumiko's house next Sunday!" which informs him of the birthday of the friend C (Yumiko) is displayed.

Figure 6C:
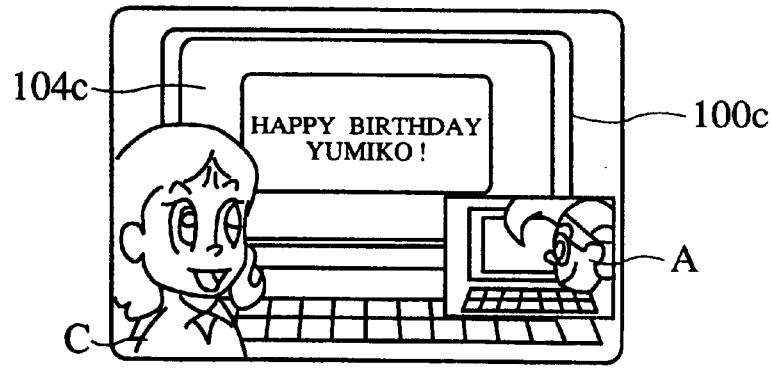

When the direction buttons 46 are operated to select a cursor "OK", and an execution instruction is given by operating the execution button 42, as shown in FIG. 6C the display in which the hero A is facing the personal computer as displayed lower right on the TV monitor screen and guides a game player to input an electronic mail by the use of he keyboard-type tablet unit. When the game player inputs "Happy birthday, Yumiko!", the input message is displayed on a display 104 of the personal computer 100c of the friend C, and the friend C can see the electronic mail.

Thus the game player can virtually experience the electronic mail.

Figure 7A:
FIG. 7 is display images on the TV monitor screen, which represent a competing fighting game using the virtual experience method according to the fist embodiment of the present invention.
Figure 8:
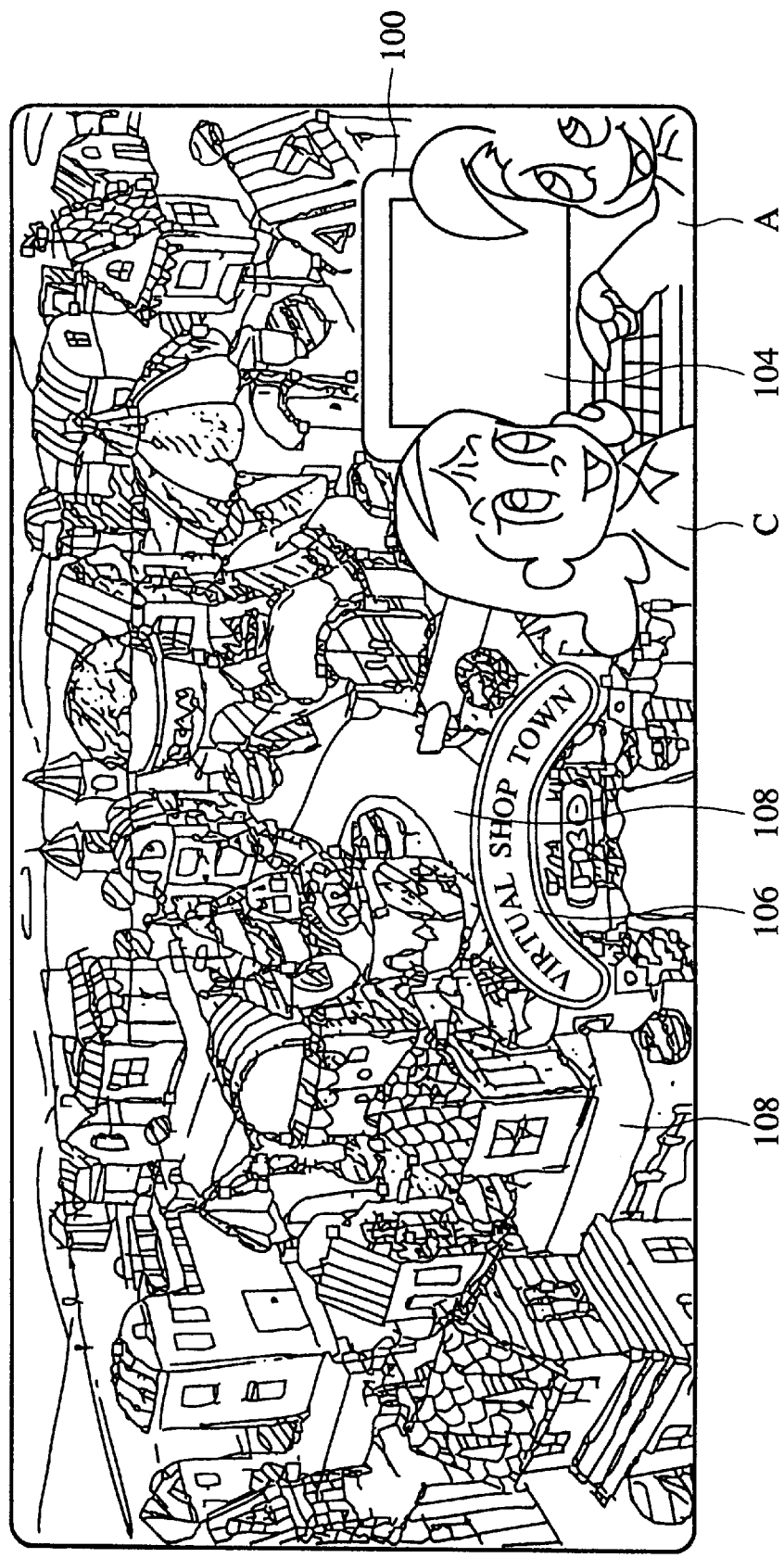
FIG. 8 is a display image on the TV monitor screen, which represents a internet shopping game using the virtual experience method according to the first embodiment of the present invention.

Then, when the competing fighting game is started, as shown in FIG. 7A the personal computer 100a is displayed, and an electronic mail from the friend D displayed lower right is displayed on the display 104a. A message of the electronic mail is "I'm now stronger in the Virtu-fighter, Ken! Let's play game on the personal computer communication" which induces the game player to play the game!

Figure 7B:
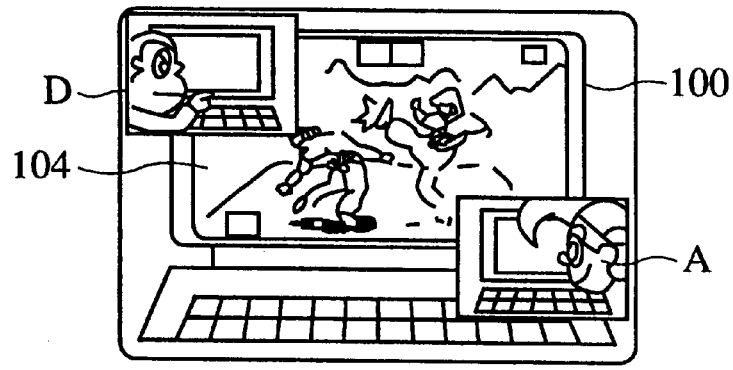

When the direction buttons 46 are operated to select the cursor "OK", and an execution instruction is given by the execution button 42, as shown in FIG. 7B a competing fighting game is displayed on a display 104 of the personal computer 100, and the competing fighting game can be played. The hero A is displayed lower right on the TV monitor screen, and the friend D is displayed upper right. The game player can enjoy a realistic competing fight. The game player operates the keys 38, the execution button 42, the direction buttons 46, etc. to play the game. When the game player wins the game, an electronic mail inviting the game player to the competing fight arrives (not shown). Whether or not the game is continued can be selected by operating the direction buttons 46 and the execution button 42.

(Internet Shopping Game)

The internet shopping game is for virtually experiencing internet shopping through images on the TV monitor. On the TV monitor screen an image which enables the game player to image internet shopping is displayed as the initial display (see FIG. 8). An entrance 106 of a virtual shop town is displayed lower at the center, and shopping mall 108 is displayed vertically and horizontally. The hero A displayed lower right and the friend C displayed on the left side of the hero A play the role of presiding over the game.

Figure 9A:
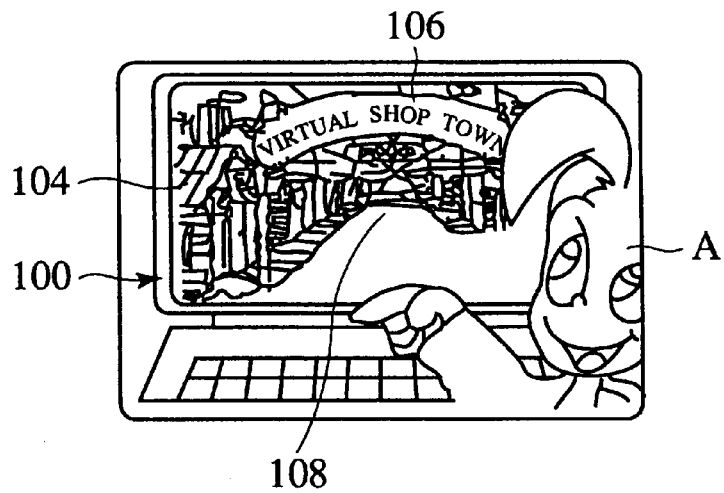
FIG. 9 is display images on the TV monitor screen, which represent a shopping game using the virtual experience method according to the first embodiment of the present invention.

When the internet shopping game is started, as the initial display the personal computer 100 is displayed, and the entrance 106 of the virtual shop town is displayed at the center of the display 104 of the personal computer 100 (see FIG. 9A).

Figure 9B:
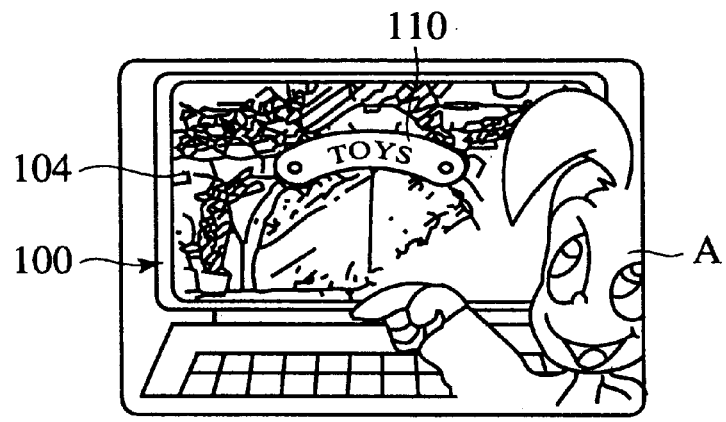
Figure 9C:
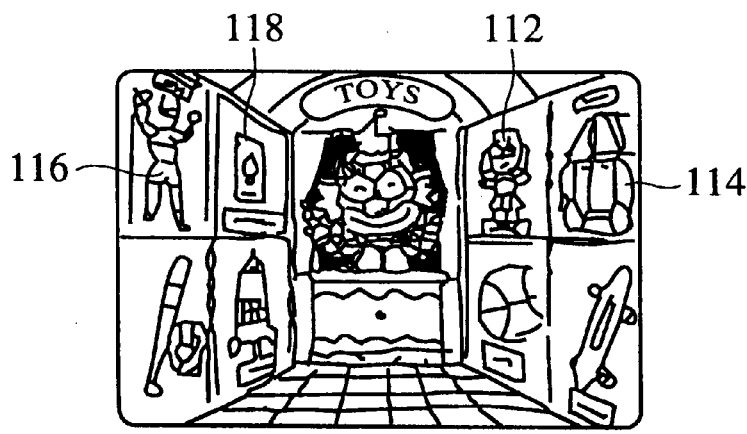

When the game player operates the direction buttons 46 to go into the shopping mall 108, as shown in FIG. 9B a toy shop 110 is displayed. When the direction buttons 46 are operated to go into the toy shop 110, as shown in FIG. 9C, a doll 112, a car 114, a robot 116, blocks 118, etc. are displayed on shelves of the toy shop 110. The game player operates the direction buttons 46 to select a toy and gives an execution instruction by operating the execution button 42, and can play with the selected toy.

When the doll 112 is selected, a dressing game is played, and a driving or a speed competition is played when the car 114 is selected. When the robot 116 is selected, a game in which an opponent character is attached, and a block building game can be played when the blocks 118 are selected.

Figure 10A:
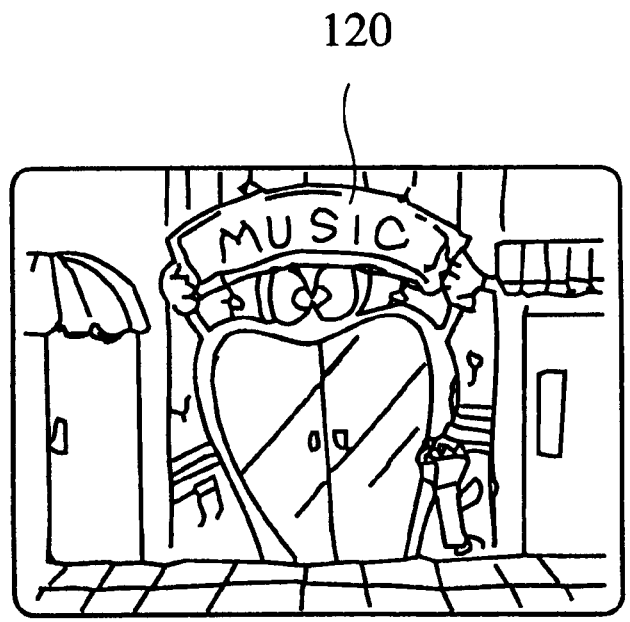
FIG. 10 is display images on the TV monitor screen, which represent a music school game using the virtual experience method according to the first embodiment of the present invention.
Figure 11:
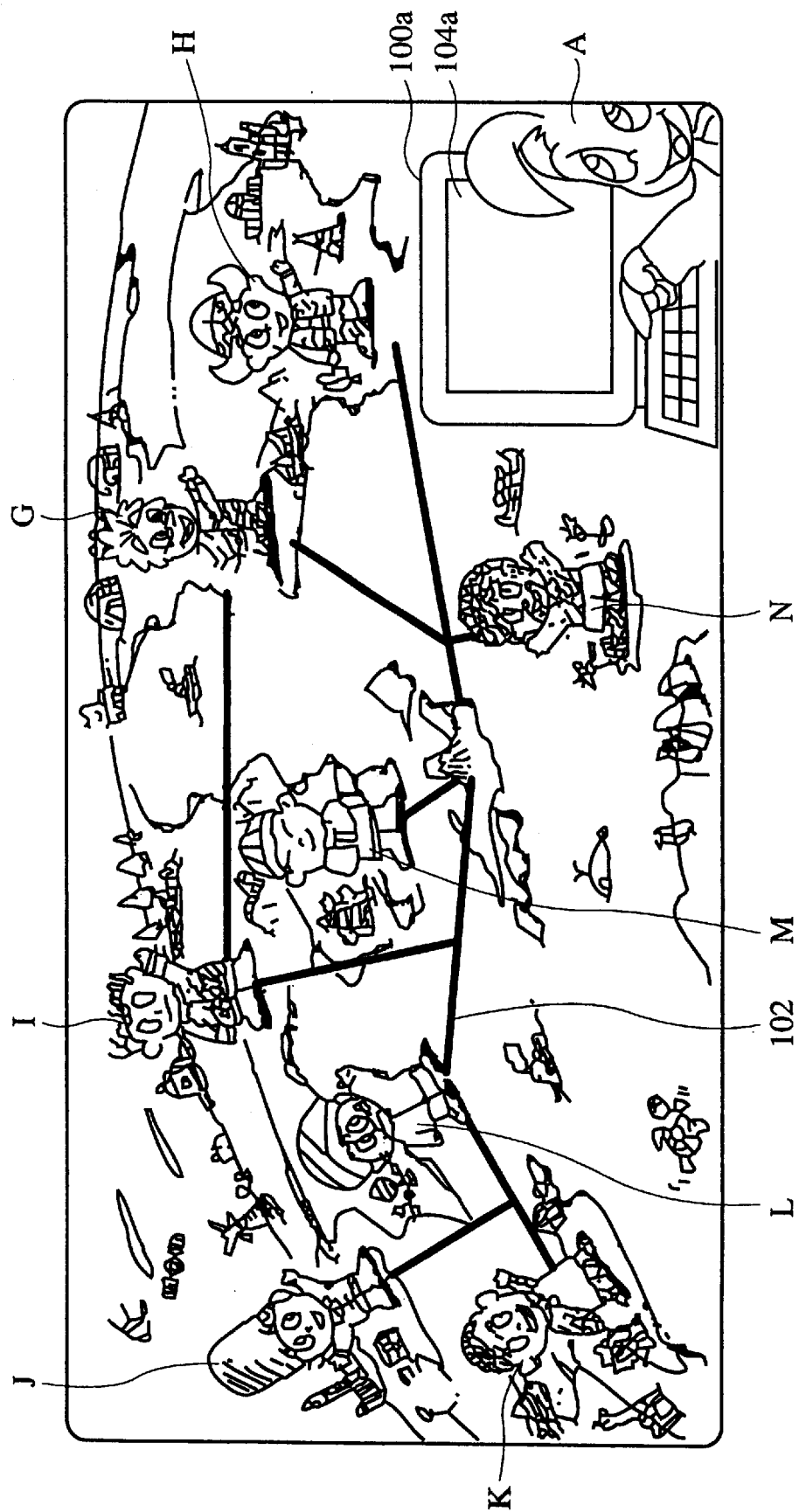
FIG. 11 is a display image on the TV monitor screen, which represents an internet communication game using the virtual experience method according to the first embodiment of the present invention.

The game player comes out of the shop and advances along the shopping mall 108, and then a music school 120 is displayed as shown in FIG. 10A. When the game player wants to enter the music school 120, he operates the direction buttons 46 to enter the music school.

In the music school 120 there are provided an auditory class, a keyboard class, etc.

In the auditory class, a game in which a tone outputted from speakers of the TV monitor is identified can be played. When one of the keys 38 assigned beforehand to a tone outputted from the speakers is pushed, a display indicative of "CORRECT" is displayed, and when uncorrect one of the keys 38 is pushed, a display indicative of "UNCORRECT" is displayed (not shown).

Figure 10B:
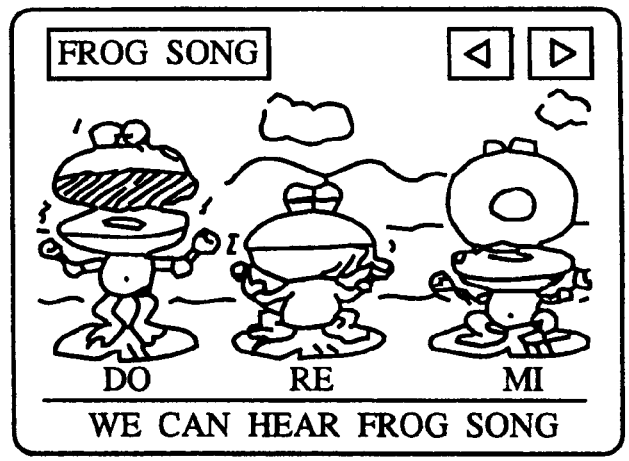

In the keyboard class, one of the keys 38 assigned beforehand to tones or figures displayed on the screen is pushed, a sound can be outputted from the speakers of the TV monitor (see FIG. 10B).

(Internet Communication Game)

In the internet communication game, internet communication is virtually experienced through images displayed on the TV monitor screen. On the TV monitor screen an image which enables the game player to image internet communication is displayed as the initial display (see FIG. 11). Friends G, H, I, J, K, L, M, N in foreign countries are interconnected with each other by a communication network 102. The hero A displayed lower right plays the role of presiding over the game.

The internet communication game has several menus to enable virtual experience games, such as greeting words quiz, architecture quiz, etc. to be played.

Figure 12A:
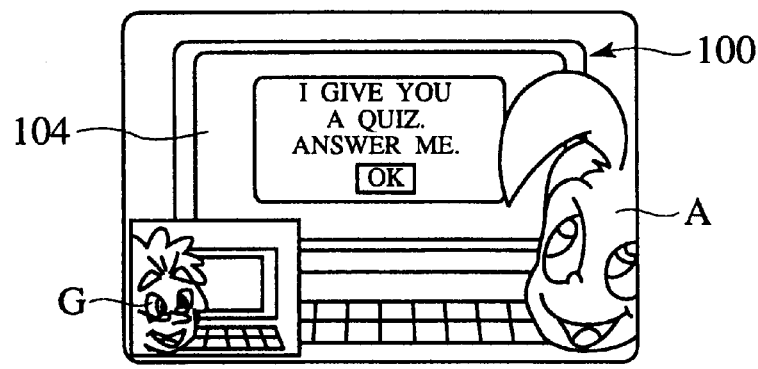
FIG. 12 is display images on the TV monitor screen, which represent a quiz game using the virtual experience method according to the first embodiment of the present invention.
Figure 12B:
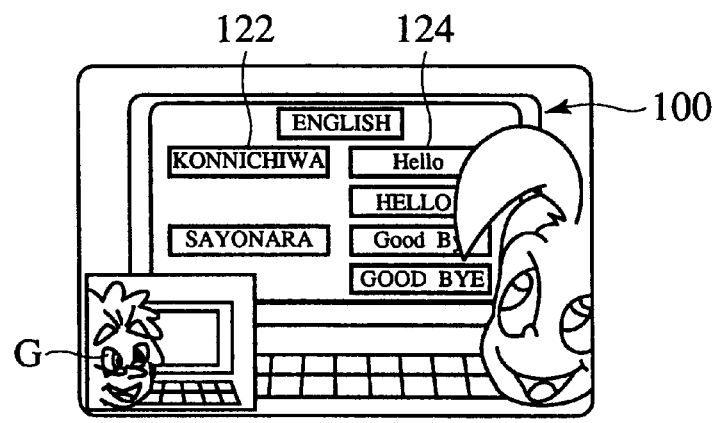

When the greeting word quiz is started, as shown in FIG. 12A, an electronic mail "Answer my quiz!" inducing the game player to answer a quiz arrives from the friend G in the U.S.A. The game player operates the direction buttons 46 to move the cursor to "OK" and operates the execution button 42 to give an execution instruction. Then, as shown in FIG. 12B, a quiz of greeting words is presented. Japanese word, such as "Kon-nichiwa", "Sayonara", etc. are displayed on a left part of the display 104, and as alternatives 124 for answers, the spells of "hello", "goodbye", etc. and pronunciations of "hello", "goodbye", etc. are displayed on a right part of the display 104. The game player operates the direction buttons 46 and the execution button 42 to select one of the alternatives 124 to answer the quiz.

Correct pronunciation are outputted from the speakers of the TV monitor, and the game player pushes the repeat button 41 to repeat the pronunciation. The game player can learn English.

Figure 12C:
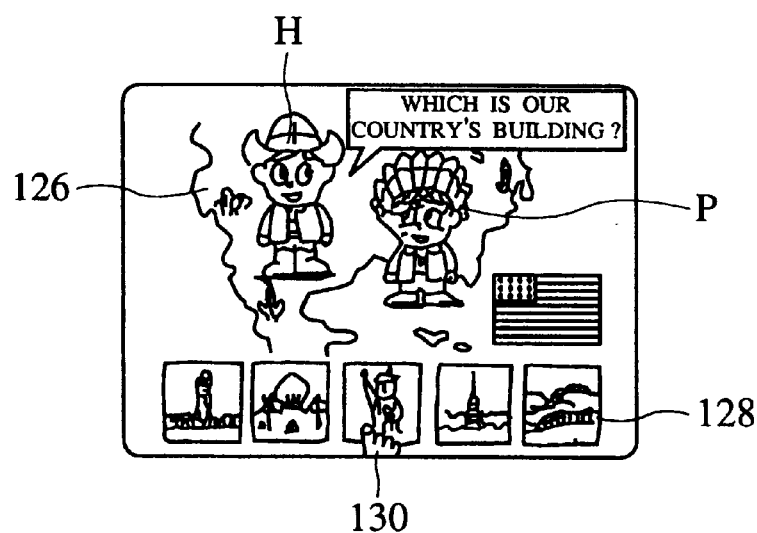

When the architecture quiz is started, as shown in FIG. 12C maps of countries 126 and illustrations 128 of famous remains and architectures of the countries are displayed. In a quiz of identifying the illustrations to the displayed countries, the friend H presents a question "Which is ours?" The game player operates the direction buttons 46 to move the cursor 130 and operates the execution button 42 to give an execution instruction to answer the question.

In the same way, the quiz of identifying the architectures to the countries can be enjoyed. Thus the game player can learn while enjoying the games.

As described above, the present embodiment can provide a virtual experience method by the use of the game device with the above-described tablet unit connected to.

[A Second Embodiment]

Figure 13:
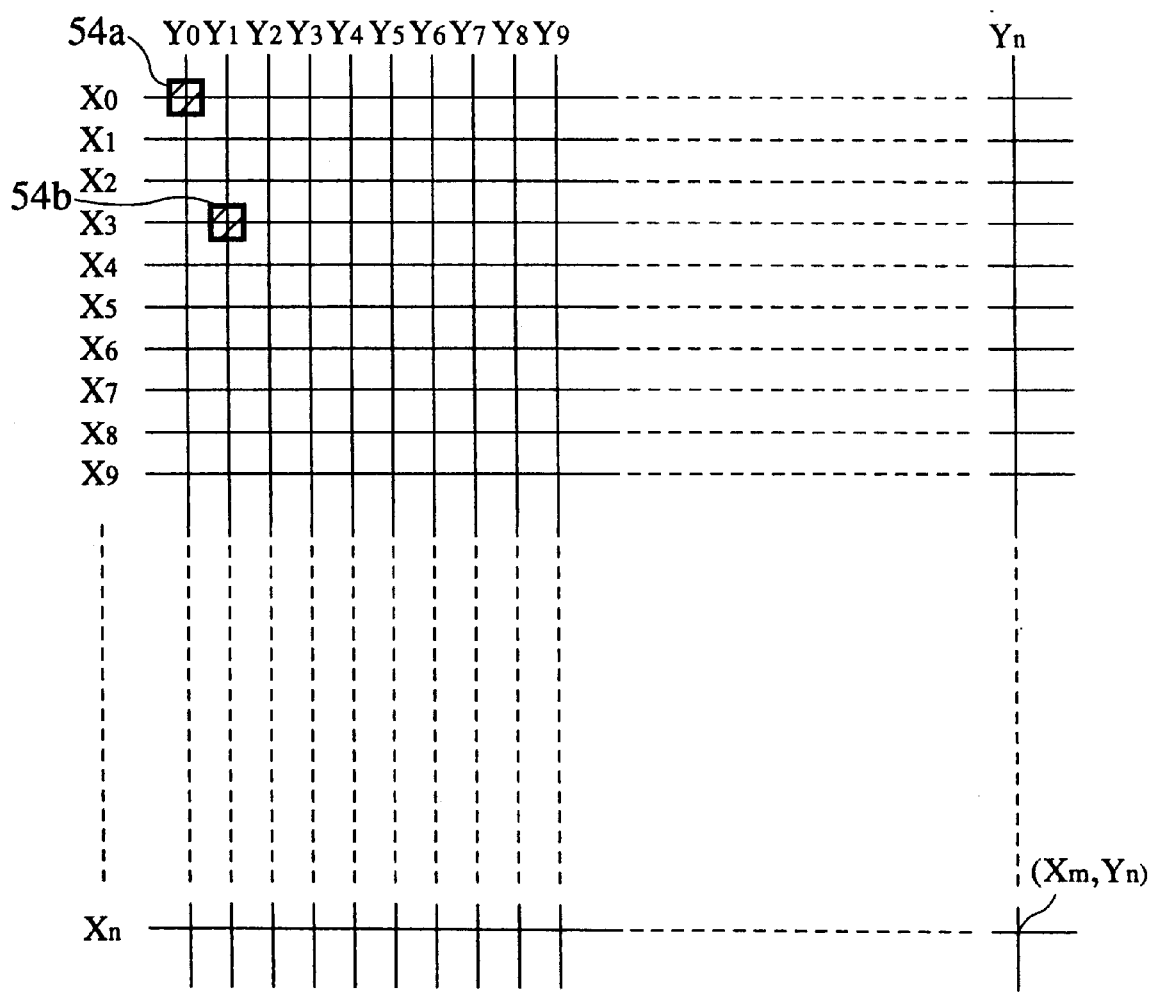
FIG. 13 is a plan view of the tablet unit according to a second embodiment of the present invention, which shows positions of the receiving parts.
Figure 14:
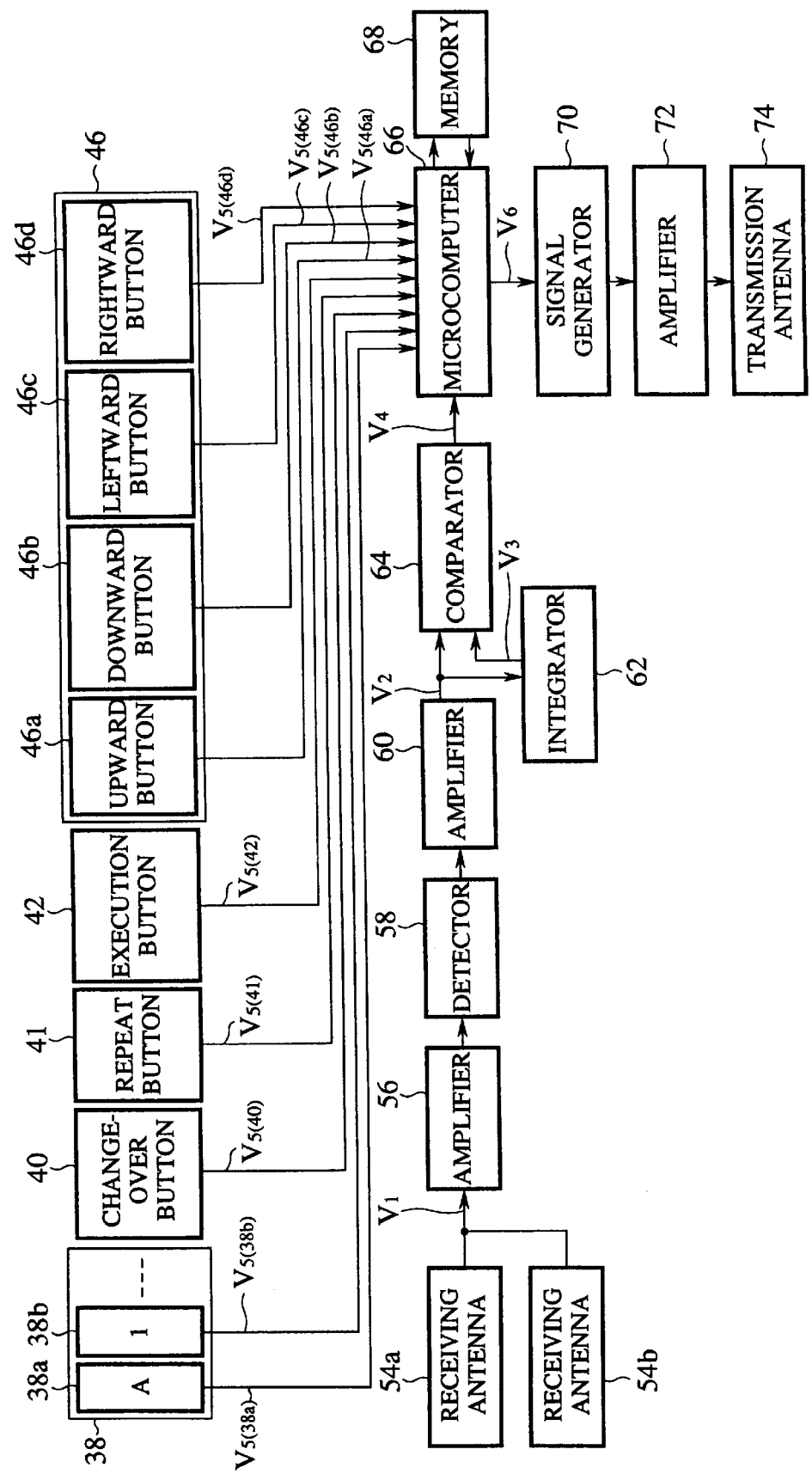
FIG. 14 is a block diagram of an electronic circuit of the tablet unit according to the second embodiment of the present invention.
Figure 15:
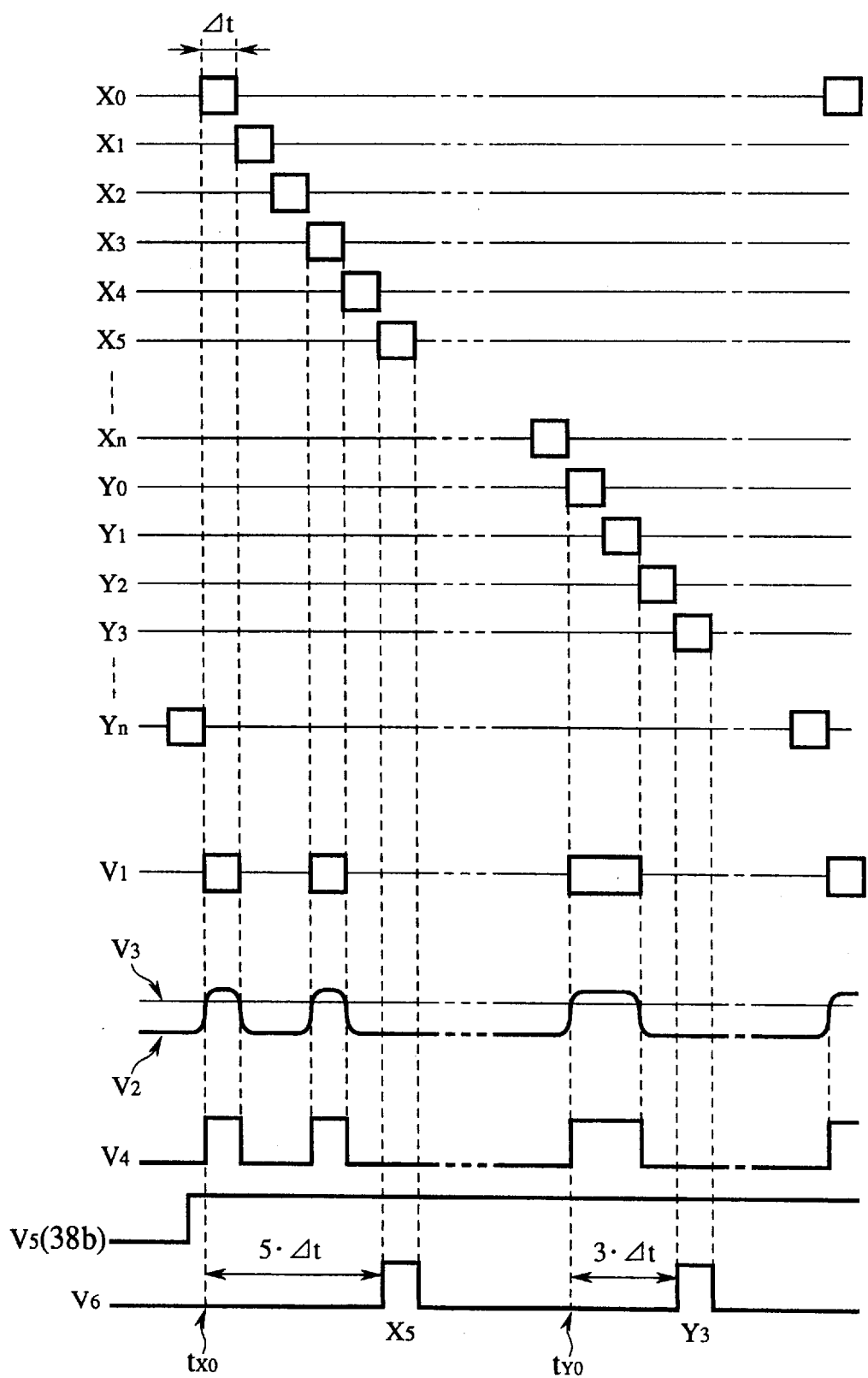
FIG. 15 is a time chart of waveforms of respective part of the tablet unit according to the second embodiment of the present invention.

The keyboard-type tablet unit according to a second embodiment of the present invention will be explained with reference to FIGS. 13 to 15. FIG. 13 is a plan view of the tablet unit according to the present embodiment, which shows receivers of a receiving antenna thereof. FIG. 14 is a block diagram of an electronic circuit of the tablet unit according to the present embodiment. FIG. 15 is a time chart of waveforms of respective part of the tablet unit according to the present embodiment. The same members of the tablet unit according to the present embodiment are represented by the same reference numbers as those of the tablet unit according to the first embodiment shown in FIGS. 1 to 12 not to repeat or to simplify their explanation.

A body 36 of the tablet unit 10 according to the present embodiment imitates a keyboard as does the body of the tablet unit 10 according to the first embodiment. The tablet unit 10 according to the present embodiment is the same as that according to the first embodiment in the rest except that a receiving antenna (not shown) has a plurality of receivers. A shown in FIG. 13, the tablet 28 (see FIG. 22) of a video game device 12 includes, as in the first embodiment, antenna lines $X_0$ to $X_m$ and antenna lines $Y_0$ to $Y_n$ arranged in a matrix. The receiving antenna of the tablet unit 10 includes two square receivers 54a, 54b. When the video game device 12 is connected to the tablet unit 10, the receiving part 54a comes near, e.g., coordinates $(X_0, Y_0)$, and the receiving part 54b comes near, e.g., coordinates $(X_3, Y_1)$.

In FIG. 13, for convenience, as in FIG. 2 the constituent members other than the antenna lines $X_0$ to $X_m$ and the antenna lines $Y_0$ to $Y_n$, and the receiving parts 54a, 54b are omitted. As in the first embodiment, the intersections between the antenna lines $X_m$ and the antenna lines $Y_n$ are coordinates $(X_m, Y_n)$.

The tablet unit 10 incorporates the electronic circuit shown in FIG. 14. The electronic circuit according to the present embodiment is the same as that of the first embodiment in the rest except that the former includes a plurality of receivers 54a, 54b of the receiving antenna.

Because the receivers 54a, 54b are respectively near coordinates $(X_0, Y_0)$ and $(X_3, Y_1)$, in the operation in the X direction, a signal $V_4$ is H level only when scan signals are supplied to the antenna lines $X_0, X_3$, and in the operation in the Y direction the signal $V_4$ is H level only when scan signals are supplied to the antenna lines $Y_0, Y_1$. A microcomputer 66 separately, based on a waveform of the signal $V_4$, detects supply of scan signals to the antenna lines $X_0$ to $X_3$ or the antenna lines $Y_0, Y_1$.

The microcomputer 66, as in the first embodiment, sets a standard time $t_{0x}$ to be a time when the signal $V_4$ becomes H level after an operation signal is supplied to the antenna line $X_0$. The microcomputer 66 sets a standard time $t_{0y}$ to be a time when the signal $V_4$ becomes H level after an operation signal is supplied to the antenna line $Y_0$.

Then, the operation performed when a 1 key 38b representing a number "1", for example, is pushed will be explained.

Coordinates $(X_5, Y_3)$, for example, is assigned to the 1 key 38b.

It is assumed that when a scan signal is supplied to, e.g., the antenna $Y_n$, the 1 key 38b is pushed, a signal $V_{5(38b)}$ is H level while the 1 key 38b is being pushed.

The microcomputer 66 reads from a memory 68 coordinate values $(X_5, Y_3)$ assigned to the 1 key 38b when the signal $V_{5(38b)}$ becomes H level. A signal $V_6$ is delayed in the standard time $t_{0x}$ for scan in the X direction by $5 \cdot \Delta t$ time to make the $V_6$ H level for a $\Delta t$ time. The signal $V_6$ is delayed in the standard time $t_{0y}$ for scan in the Y direction by a $3 \cdot \Delta t$ time to make the signal $V_6$ H level for a $\Delta t$ time. This operation is repeated while one 1 key 38b is being pushed.

Thus the microcomputer 66 can make the signal $V_6$ H level in agreement with timing of scan signals being supplied to the antenna lines $X_5, Y_3$.

As in the first embodiment, while the signal $V_6$ is being H level, a 455 kHz alternate signal is generated by a signal generator 70, amplified by an amplifier 72 and outputted by a transmission antenna 74. The 455 kHz alternate signal outputted by the transmission antenna 74 is inputted to the video game device 12 through a touch pen 50 and a signal cable 51.

The tablet unit 10 thus generates the same signal generated by approaching the touch pen 50 to coordinates $(X_5, Y_2)$ on the tablet 28 and inputs the signal to the video game device 12.

A memory of the video game device 12 stores that the coordinate values $(X_5, Y_3)$ are assigned to the 1 key 38b, so that the microcomputer 66 of the video game device 12 can detect push of the 1 key 38b.

In the same way push of the keys 38, a change-over button 40, a repeat button 41, an execution button 42 and direction buttons 46 can be detected.

As described above, according to the present embodiment, the tablet unit for inputting instruction information by approaching the touch pen to the tablet, which can be removalby connected to a game device and permits operation inputs to be made by a number of keys, etc. can be provided.

A virtual experience method by the use of the video game device with the keyboard-type tablet according to the second embodiment connected to is the same as that according to the fist embodiment.

[A Third Embodiment]

(Telephohe-Type Tablet Unit)

Figure 16:
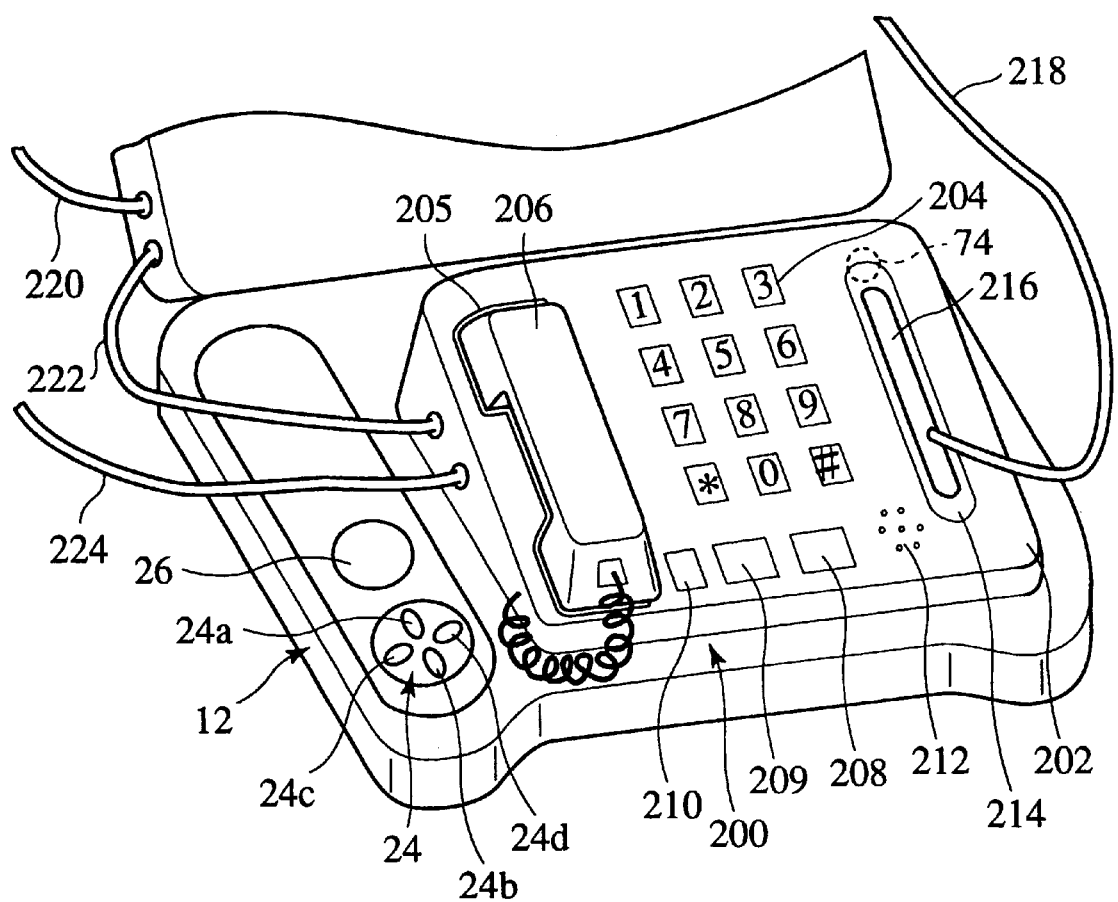
FIG. 16 is a perspective view of the tablet unit according to a third embodiment of the present invention.

The tablet unit according to a third embodiment of the present invention will be explained with reference to FIG. 16. FIG. 16 is a perspective view of the tablet unit according to the present embodiment. The same members of the tablet unit according to the present embodiment as those of the tablet unit according to the first and the second embodiments shown in FIGS. 1 to 15 are represented by the same reference numbers not to repeat or to simplify their explanation.

As shown in FIG. 16, the table unit 200 according to the present embodiment is characterized in that the tablet unit imitates a telephone. The tablet unit 200 includes a body 202 imitating a telephone and is connected to a video game device 12 which is an image device.

Push buttons 204 are arranged in a matrix at the center of the tablet unit 200. A handset holder 205 is disposed on the left side of the push buttons 204 and holds a handset 206.

A change-over switch 208 for switching between a speaker (not shown) of a TV monitor and a speaker (not shown) of the handset is disposed on the foreground below the push buttons 204. A Japanese button 209 for changing English voices to Japanese voices is disposed on the left side of the change-over button 208, and an echo button 210 for echoing voices is disposed on the left side of the Japanese button 209. A speaker 212 for outputting call sounds, etc. is disposed on the right side of the changeover button 208.

A touch pen holder 214 is disposed on the right side of the push buttons 204. The touch pen 214 holds a touch pen 216. A signal cable 218 connects the touch pen 216 to a signal input terminal (not shown) of the video game device 12.

A video signal cable 220 connects a video output terminal (not shown) of the video game device 12 to a video input terminal (not shown) of the TV monitor.

An audio signal cable 222 connects an audio output terminal (not shown) of the video game device 12 to an audio input terminal (not shown) of the tablet unit 200.

An audio signal cable 224 connects an audio output terminal (not shown) of the tablet unit 200 to an audio input terminal (not shown) of the TV monitor.

As described above, according to the present embodiment, the table unit for inputting instruction information by approaching the touch pen to the tablet, which can be removably connected to a game device and permits operation inputs to be made by a number of keys, etc. can be provided.

The tablet unit 200 according to the present embodiment is the tablet 10 according to the first or the second embodiment formed in a telephone. The tablet unit 200 according to the present embodiment has the same operation as the tablet unit according to the first or the second embodiment, and the operation is not explained here.

(Virtual Experience Method)

Figure 18:
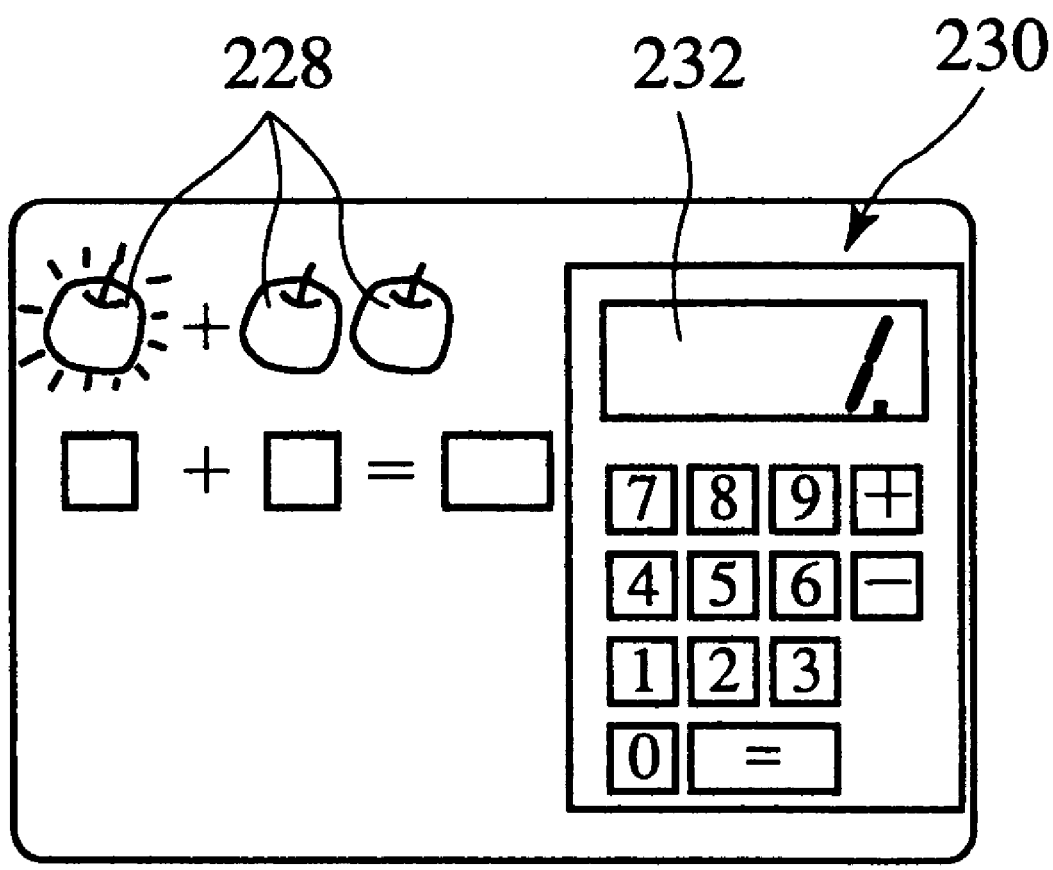
FIG. 18 is a display image on the TV monitor screen, which shows an electronic calculator game using the virtual experience method according to the third embodiment of the present invention.
Figure 19:
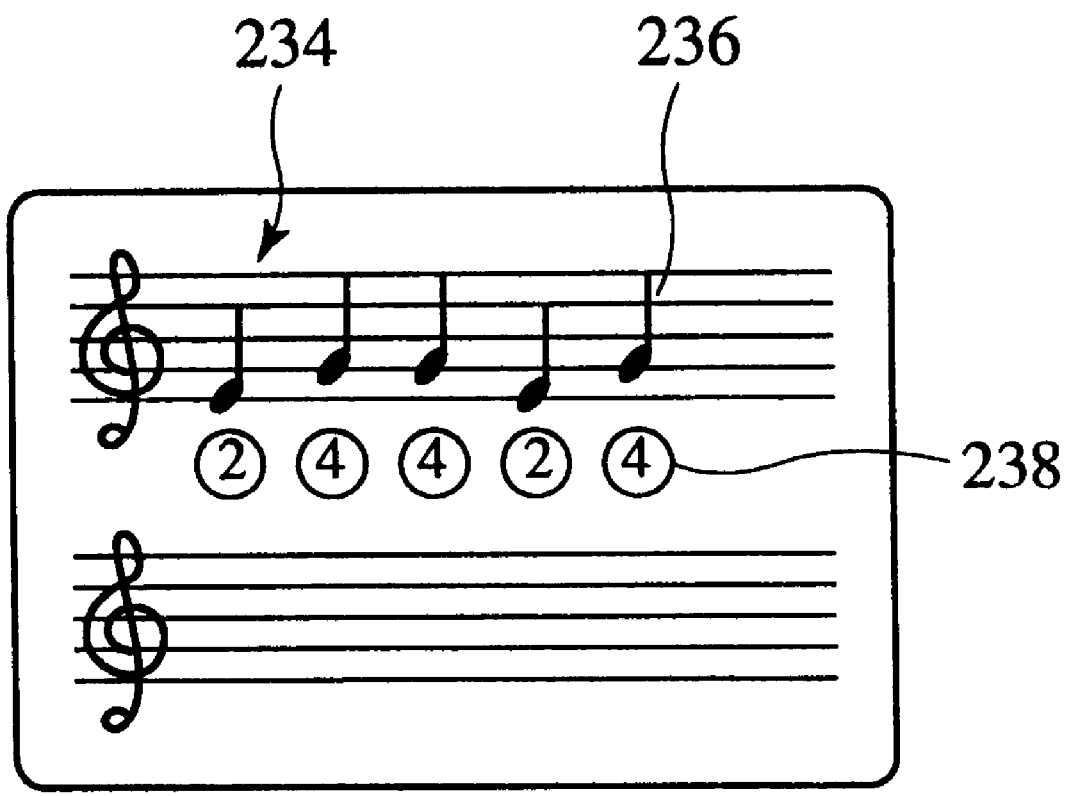
FIG. 19 is a display image on the TV monitor screen, which shows a keyboard game using the virtual experience method according to the third embodiment of the present invention.
Figure 20:
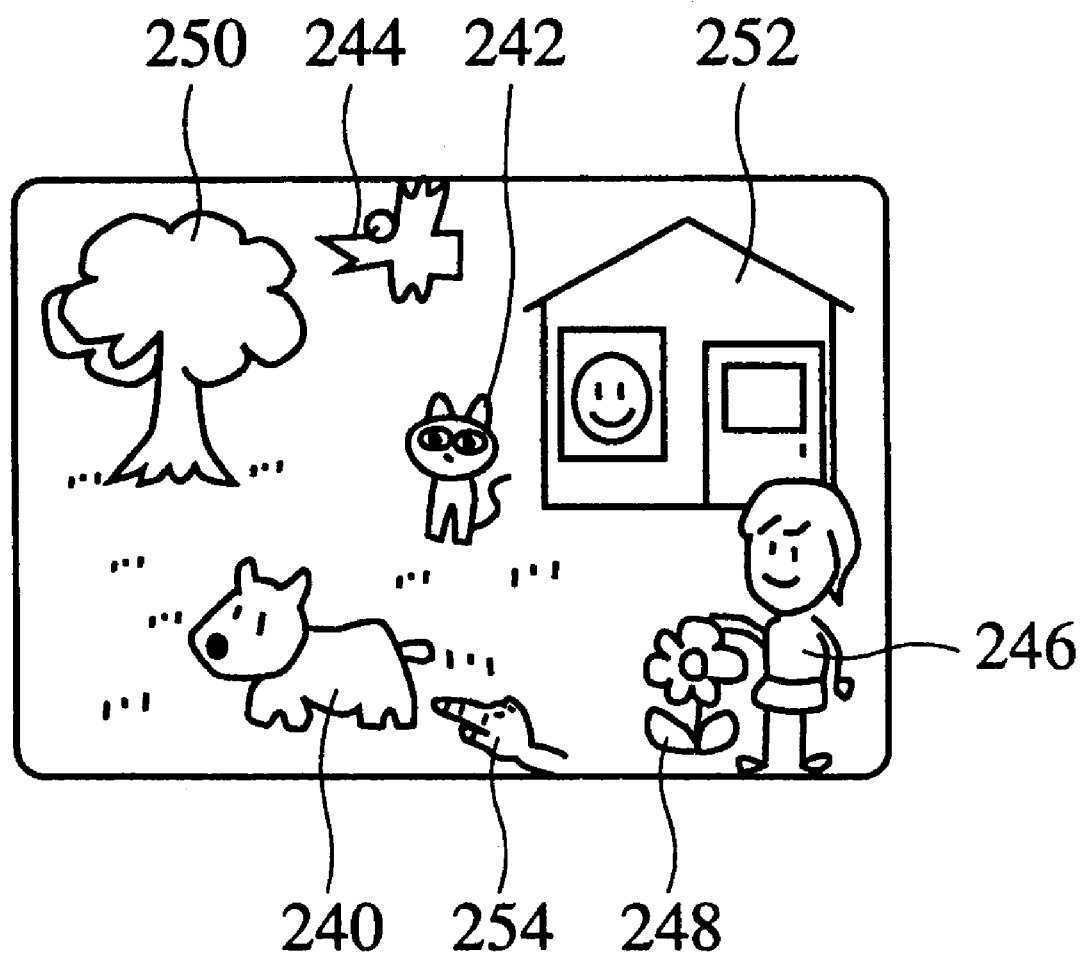
FIG. 20 is a display image on the TV monitor screen, which shows a voice identifying game using the virtual experience method according to third embodiment of the present invention.
Figure 21:
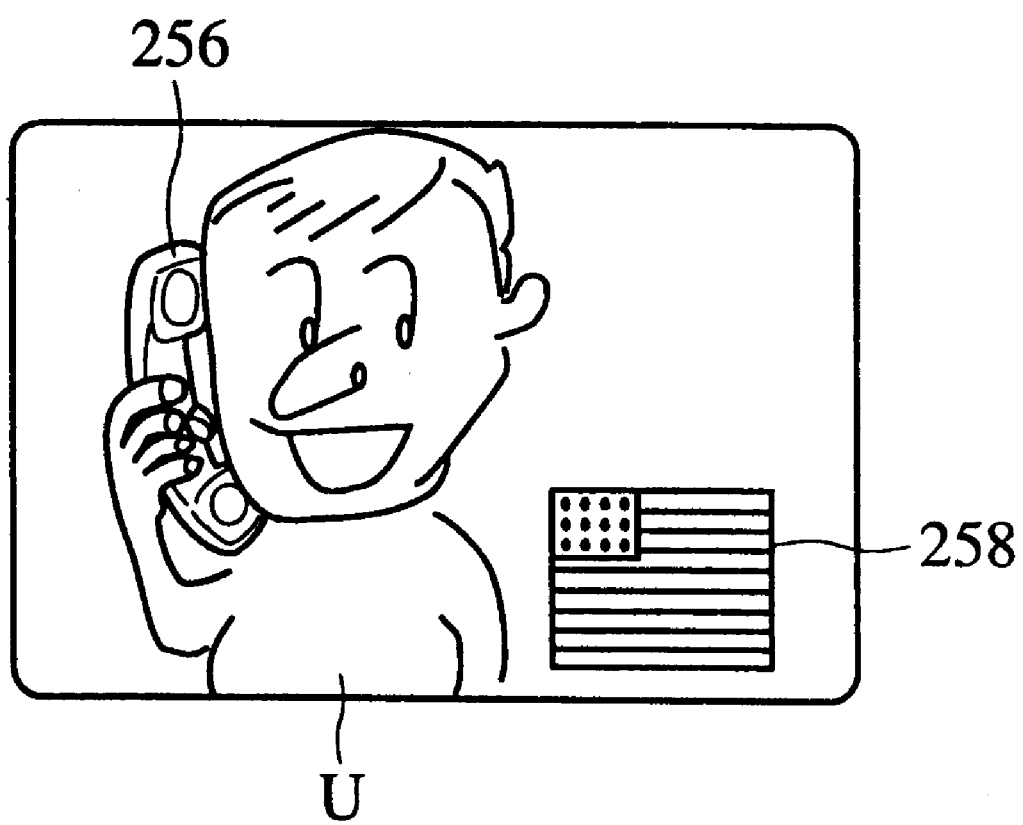
FIG. 21 is a display image on the TV monitor screen, which shows an English hearing game using the virtual experience method according to the third embodiment of the present invention.

Next, the virtual experience method by the use of the video game device 12 connected to the tablet unit 200 according to the present embodiment will be explained with reference to FIGS. 17 to 21. FIG. 17 shows images of a telephone game by the virtual experience method according to the present embodiment, which are displayed on the TV monitor screen. FIG. 18 is a display of an electronic calculator game by the virtual experience method according to the present embodiment, which is displayed on the TV monitor screen. FIG. 19 is a display of a keyboard game by the virtual experience method according to the present embodiment, which is displayed on the TV monitor screen. FIG. 20 is a display of a sound identifying game by the virtual experience method according to the present embodiment, which is displayed on the TV monitor screen. FIG. 21 is a display of an English hearing game by the virtual experience game according to the present embodiment, which is displayed on the TV monitor screen. The same members of the virtual experience method according to the present embodiment as those of the tablet unit according to the first and the second embodiment shown in FIGS. 1 to 15 and the virtual experience method according to the tablet unit are represented by the same reference numbers not to repeat or to simplify their explanation.

By the video game device 12 connected to the tablet unit 200 virtual experiences, such as a TV telephone game, a number quiz game, an electronic calculator game, a tone quiz game, a keyboard game, a karaoke game, a pronunciation game, a voice register game, an international telephone game, etc. can be enjoyed.

(TV Telephone Game)

First, the virtual experience method for the TV telephone game will be explained.

Figure 17A:
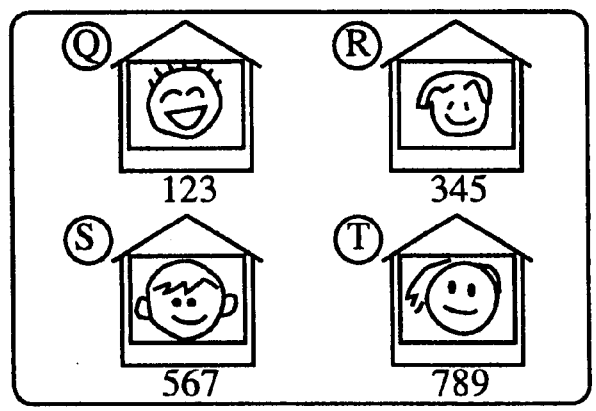
FIG. 17 is display images on the TV monitor screen, which shows a telephone game using the virtual experience method according to the third embodiment of the present invention.

In the TV telephone game, on the TV monitor screen (not shown), a friends Q, R, S and T, and their telephone numbers "123", "345", "567" and "789" are displayed (see FIG. 17A).

A game player can play a game of phoning the friends Q, R, S, T. For example, when the game player takes up the handset 206 and pushes the phone number "123" of the friend Q, the friend Q is distinguishably displayed, and call sounds are outputted from a speaker (not shown) of the TV monitor (not shown).

Figure 17B:
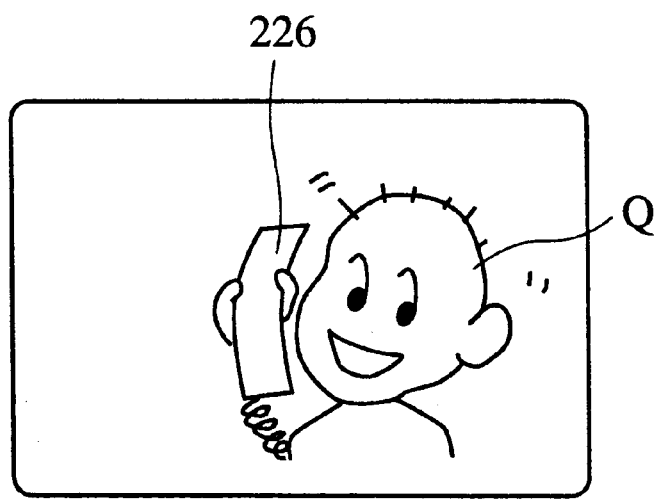

After a while, the image shown in FIG. 17B in which the friend Q holds the handset 226 is displayed on the TV monitor screen, and concurrently therewith the call sounds are stopped.

When the game player speaks in the handset 206, his voices are outputted from the speaker of the TV monitor. The friend Q displayed on the TV monitor screen often nods in accordance with the game player's voices.

The game player can play the game of receiving calls from the friends Q, R, S and T. For example, when the game player receives a call from the friend R (not shown), call sounds are outputted from the speaker 212. When the game player takes up the handset 206, the call sounds are stopped, and voices of the friend R are outputted from the speaker (not shown) of the handset 206.

The friend R can present, e.g., a quiz. The quiz can be answered by pushing the push button 204. An answer being correct or uncorrect may be indicated on the TV monitor, or may be outputted from the speaker of the TV monitor or that of the handset 206.

(Number Quiz Game)

Then, the virtual experience of the number quiz game will be explained.

In the number quiz game, a character (not shown) is displayed on the TV monitor screen, and the character present number quizes. The quizes are auditorily presented and are outputted from the speaker of the TV monitor or that of the handset 206.

The game player presses the push buttons 204 to answer the quizes.

An answer being correct or erroneous may be indicated on the TV monitor, or may be outputted from the speaker of the TV monitor or that of the handset 206.

(Electronic Calculator Game)

Then, the virtual experience method for the electronic calculator game will be explained.

In the electronic calculator game, on the TV monitor screen, fruits 228 to be counted and an electronic calculator are displayed (see FIG. 18).

Those of the fruits 228 to be counted are distinguishably displayed, and the game player counts a number of the distinguishably displayed fruits 228 and pushes a push button 204 corresponding to a counted number. A value of the pressed push button 204 is displayed on a display 232 of the electronic calculator 230.

When the game player has made a correct answer, those of the fruits 228 to be next counted are distinguishably displayed. When the game player has made an erroneous answer, the distinguished display is not shifted, and a buzzer sound indicative of error is outputted from the speaker of the TV monitor.

The game player goes on correctly answering numbers of the fruits 228, and a calculated result is displayed on the display 232.

As described above, the game player can learn how to use an electronic calculator and the basic concept of addition and subtraction while playing.

(Tone Quiz Game)

Then, the virtual experience method for the tone quiz game will be explained.

In the tone quiz game, a character (not shown) displayed on the TV monitor screen plays a tone by a musical instrument, the tone is outputted from the speaker of the TV monitor, and the game player pushes the push button 204 corresponding to the tone to answer the quiz.

Tones are in advance assigned to the respective push buttons 204.

Correctly or erroneously answering the quiz may be displayed on the TV monitor or outputted from the speaker of the TV monitor or the speaker of the handset 206.

(Keyboard Game)

Next, the keyboard game will be explained.

In the keyboard game, as shown in FIG. 19, a musical score 234 and musical notes 236 are displayed on the TV monitor screen. Under the musical notes 236, numbers 238 are displayed respectively.

The game player pushes the push buttons 204 in accordance with numbers 238 displayed on the screen, and sounds are outputted from the speaker of the TV monitor.

Thus the game player can play music.

(Karaoke Game)

Then the karaoke game will be explained.

In the karaoke game, the handset 206 is used as a microphone. Voices of the game player inputted through the handset 206 are outputted from a speaker 212 of the tablet unit 200 or the speaker of the TV monitor.

As a words (not shown) is displayed on the TV monitor, and an accompanying melody is outputted is outputted from the speaker of the TV monitor.

An echo button 210 is pushed to turn on/off echo, which makes Karaoke Game realistic.

(Pronunciation Game)

Then, the pronunciation game will be explained.

In the pronunciation game when the game player pronounces letters or illustrations presented as questions, correctness or error can be visible.

First, on the TV monitor screen quiz contents, letter (not shown), illustrations (not shown) or others are displayed. When the game player inputs correct pronunciation of the letters or illustrations in the handset 206, the pronunciation being correct or erroneous is judged by an audio recognition circuit provided in the tablet unit 200.

The game player's pronunciation being correct or erroneous may be displayed on the TV monitor screen, or may be outputted from the speaker of the TV monitor or that of the handset 206.

Contents of the quiz are not essentially letters or illustrations but may be pronounced by a character (not shown) displayed on the TV monitor screen. When the game player follows a pronunciation of the character, correctness or error is judged based on his pronunciation.

(Voice Register Game)

Then the voice register game will be explained.

In the voice register game specific words are registered corresponding to characters displayed on the TV screen, and when the game player speaks the specific words, the characters response to the spoken specific words.

On the TV monitor screen as shown in FIG. 20, a dog 240, a cat 242, a bird 244, a person 246, a flower 248, a tree 250, a house 252, etc. are displayed.

The game player operates the direction buttons 24 and the execution button 26 to move the cursor 254 to command, e.g., the dog 240. When the game player inputs "Pochi" in the handset 206 and operates the execution button 26 to register the voice, the voice for the dog 240 can be registered. Following the register, when the game player calls "Pochi", the dog runs about, crying.

When other game players call "Pochi", if their intonations and pronunciations are different from the registered voice, the dog does not react to their calls. The game player can thus be satisfied with his own pet.

(International Telephone Game)

Then, the international telephone game will be explained.

In the international telephone game, the message of a telephone call from a foreign country can be changed between two languages, e.g., the Japanese language and the English language.

Here is an international telephone call from, e.g., the U.S.A. When the game player takes up the handset 206, a friend U in the U.S.A. having a handset 256 held on an ear, and a national flag 258 are displayed on the TV monitor screen. "Good morning" in English can be heard first from the speaker of the handset 206 held by the game player on an ear. It is assumed that the game player cannot understand English. When the game player pushes the Japanese language button 209, a Japanese word "Ohayogozaimasu" can be heard.

An English word and a Japanese word are thus corresponded to each other, which enables the game player to learn the languages.

The voices may be outputted from the speaker of the TV monitor.

As described above, the video game device with the tablet unit according to the present embodiment connected to can provide the virtual experience method.

(Modifications)

The present invention is not limited to the above-described embodiments and can cover other various modifications.

In the first embodiment, for example, the receiving antenna 54 may have any shape as long as the shape has an X-direction length and a Y-direction length which are different from each other, and the signal $V_4$ has different waveforms between the X-direction and the Y-direction.

In the second embodiment, for example, an interval between the receivers 54a and 54b in the X-direction is different from that in the Y-direction, and the signal $V_4$ has different waveforms between the X-direction and the Y-direction.

In the second embodiment, for example, the receivers 54a, 54b may have any shape as long as the signal $V_4$ has different waveforms between the X-direction and the Y-direction.

The body of the table unit may imitate any object, e.g., a keyboard, an electronic calculator, etc.

The virtual experience method using a game device connected to the tablet unit may be nay virtual experience method, such as chat.

What is claimed is:

1. A tablet unit for inputting required instruction information by approaching a touch pen to a tablet including antenna lines for a scan signal to be supplied to and being removably connectable to an electronic device, the tablet unit comprising:

a receiving antenna which is brought near a prescribed position on the tablet when the tablet unit is connected to the electronic device and receives the scan signal supplied to the antenna line;

operating means which has coordinate values on the tablet assigned to and inputs instruction information by operation of an operator;

instruction signal generating means for generating an instruction signal delayed with respect to the scan signal received by the receiving antenna by a prescribed time which is based on the coordinate values assigned to the operating means when the operating means is operated by the operator; and transmitting means which is brought near the touch pen when the tablet unit is connected to the electronic device and transmits the instruction signal generated by the instruction signal generating means to the touch pen.

2. A tablet unit according to claim 1, wherein the receiving antenna has a non-symmetric receiving surface, and the scan signal received by the receiving surface of the receiving antenna differs depending on a scan direction of the tablet.

3. A tablet unit according to claim 1, wherein the receiving antenna includes a plurality of receiving parts, and the scan signal received by said a plurality of receiving parts of the receiving antenna differs depending on scan directions of the tablet.

4. A tablet unit according to claim 1, wherein the tablet unit imitates a keyboard, and the operating means is a plurality of keys of the keyboard.

5. A virtual experience method using the electronic device with the tablet unit according to claim 4 connected to, personal computer communication, game or educational virtual experiences are enjoyed by operating said a plurality of keys.

6. A tablet unit according to claim 1, wherein the tablet unit imitates a telephone and further comprises a handset for inputting/outputting voices, and the operating means is a plurality of buttons of the telephone.

7. A virtual experience method using the electronic device with the tablet unit according to claim 6 connected to, telephone communication, game or educational virtual experiences are enjoyed by inputting/outputting voices in/from the handset by operating said a plurality of buttons of the telephone.

* * * * *